(12) United States Patent
Girouard

(10) Patent No.: US 6,464,426 B1
(45) Date of Patent: Oct. 15, 2002

(54) VEHICLE DISPENSING SYSTEM

(76) Inventor: Pierre Girouard, 152, Route 236, St-Stanislas de Kostka, Quebec (CA), J0S 1W0

( * ) Notice: Subject to any disclaimer, the term of this patent is extended or adjusted under 35 U.S.C. 154(b) by 31 days.

(21) Appl. No.: 09/654,479

(22) Filed: Sep. 1, 2000

(30) Foreign Application Priority Data

Sep. 6, 1999 (GB) .............................................. 9920838

(51) Int. Cl.$^7$ ................................................. B60P 1/40
(52) U.S. Cl. ....................... 404/101; 404/108; 414/503; 414/504; 414/505; 414/508
(58) Field of Search .............. 198/839, 861.4, 198/861.5, 861.6, 826; 414/503, 504, 505, 523, 528; 404/101, 108

(56) References Cited

U.S. PATENT DOCUMENTS

| | | | | |
|---|---|---|---|---|
| 2,979,187 A | * | 4/1961 | Erickson | |
| 3,139,970 A | * | 7/1964 | Mordstein | |
| 3,523,606 A | * | 8/1970 | Oury | |
| 3,633,879 A | * | 1/1972 | Prichard | |
| 3,684,255 A | * | 8/1972 | Rossi | |
| 3,856,133 A | * | 12/1974 | Dyachkov | |
| 4,392,769 A | * | 7/1983 | Lowery | |
| 4,553,898 A | * | 11/1985 | Feterl | |
| 4,874,283 A | * | 10/1989 | Hurley, Jr. | |
| 4,930,625 A | * | 6/1990 | Wilson | |
| 5,248,029 A | * | 9/1993 | Valcalda | |
| 5,297,665 A | * | 3/1994 | Smith | |
| 6,155,407 A | * | 12/2000 | Shelstad | |
| 6,283,697 B1 | * | 9/2001 | Pierce et al. | 198/316.1 |
| 2001/0051073 A1 | * | 12/2001 | Richter | 404/75 |
| 2002/0041793 A1 | * | 4/2002 | Rower | 404/118 |

* cited by examiner

Primary Examiner—David Bagnell
Assistant Examiner—Katherine Mitchell

(57) ABSTRACT

A flowable material delivering vehicle in combination with a material dispensing system including a fixed conveyor extending continuously from a position located adjacent a vehicle container outlet aperture to a position located adjacent a vehicle cab front end. A dispensing adapter is attached to the vehicle for receiving a portion of the flowable material when the latter emanates from the fixed conveyor. In one embodiment, the dispensing adapter includes a pivotable conveyor pivotally attached to the vehicle and a configuring mechanism. The configuring mechanism allows the pivotable conveyor to pivot between a stowed configuration wherein it lies in a generally proximal and parallel relationship relative to an edge of the vehicle and a working configuration wherein the pivotable conveyor extends away from the vehicle so as to allow discharging of the flowable material away from the vehicle. In another embodiment, the dispensing adapter includes a dispensing chute defining a chute inlet end positioned adjacent the fixed conveyor discharge section, a laterally and downwardly extending chute body and a chute outlet end positioned laterally relative to the vehicle.

27 Claims, 14 Drawing Sheets

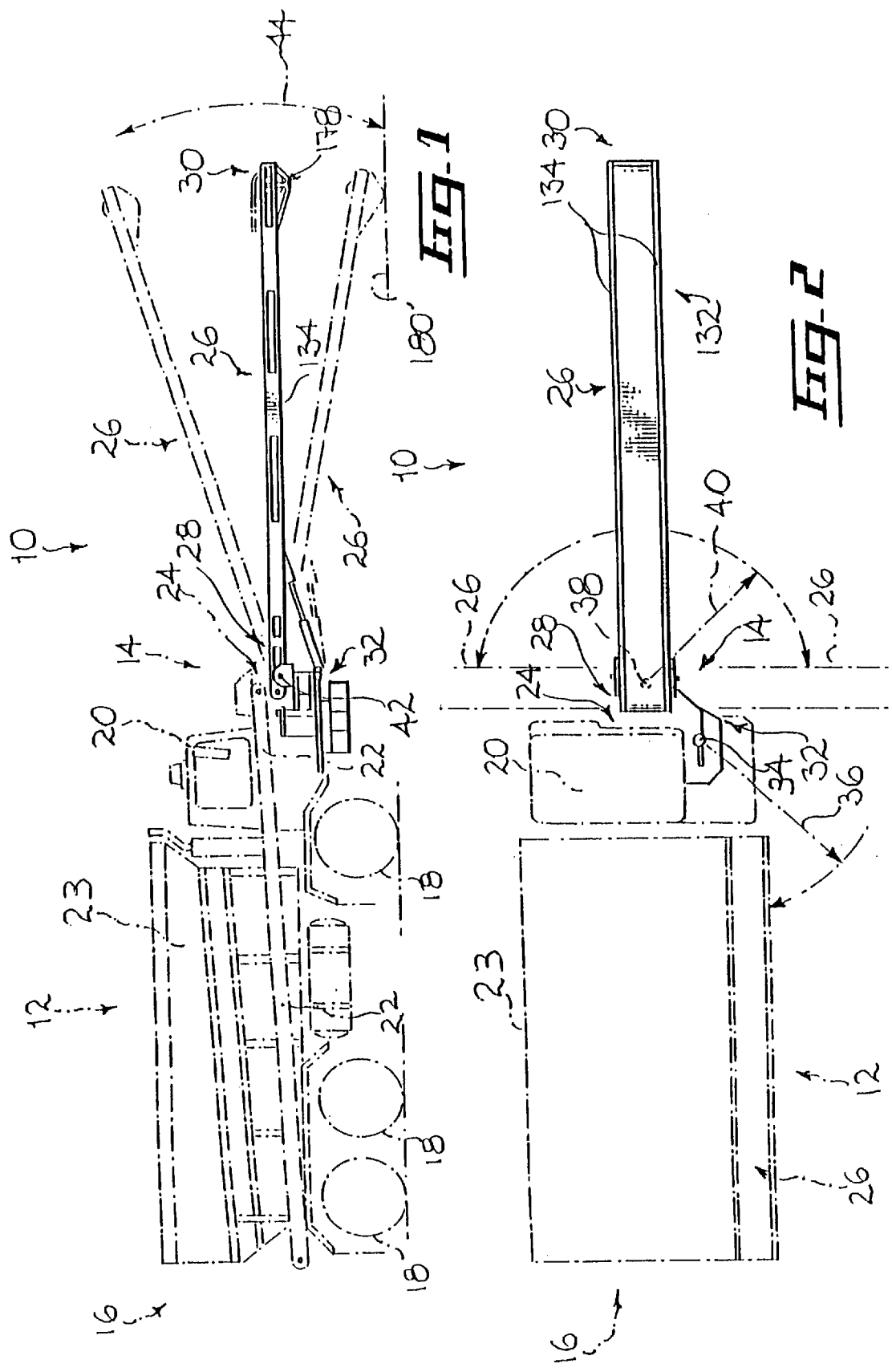

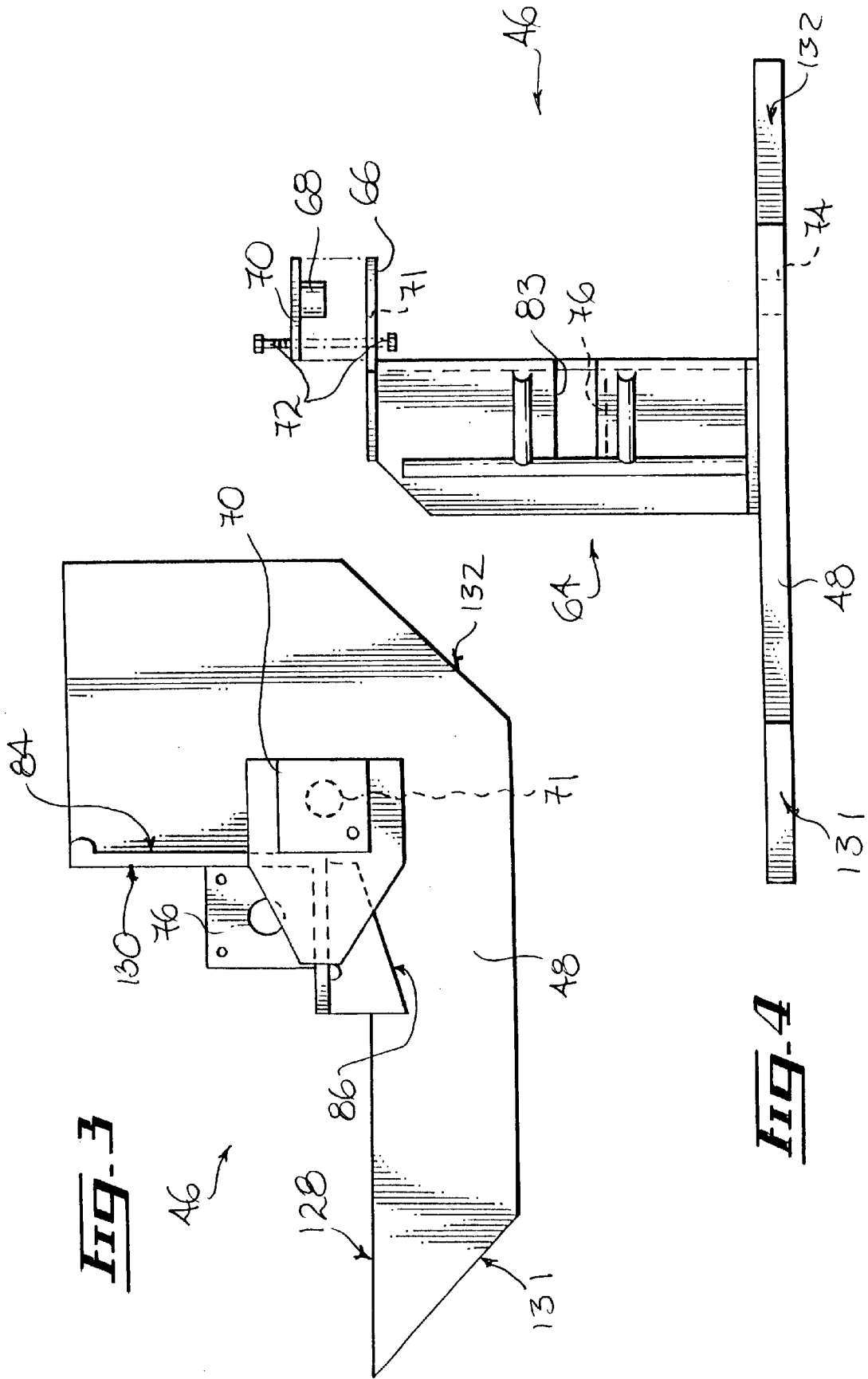

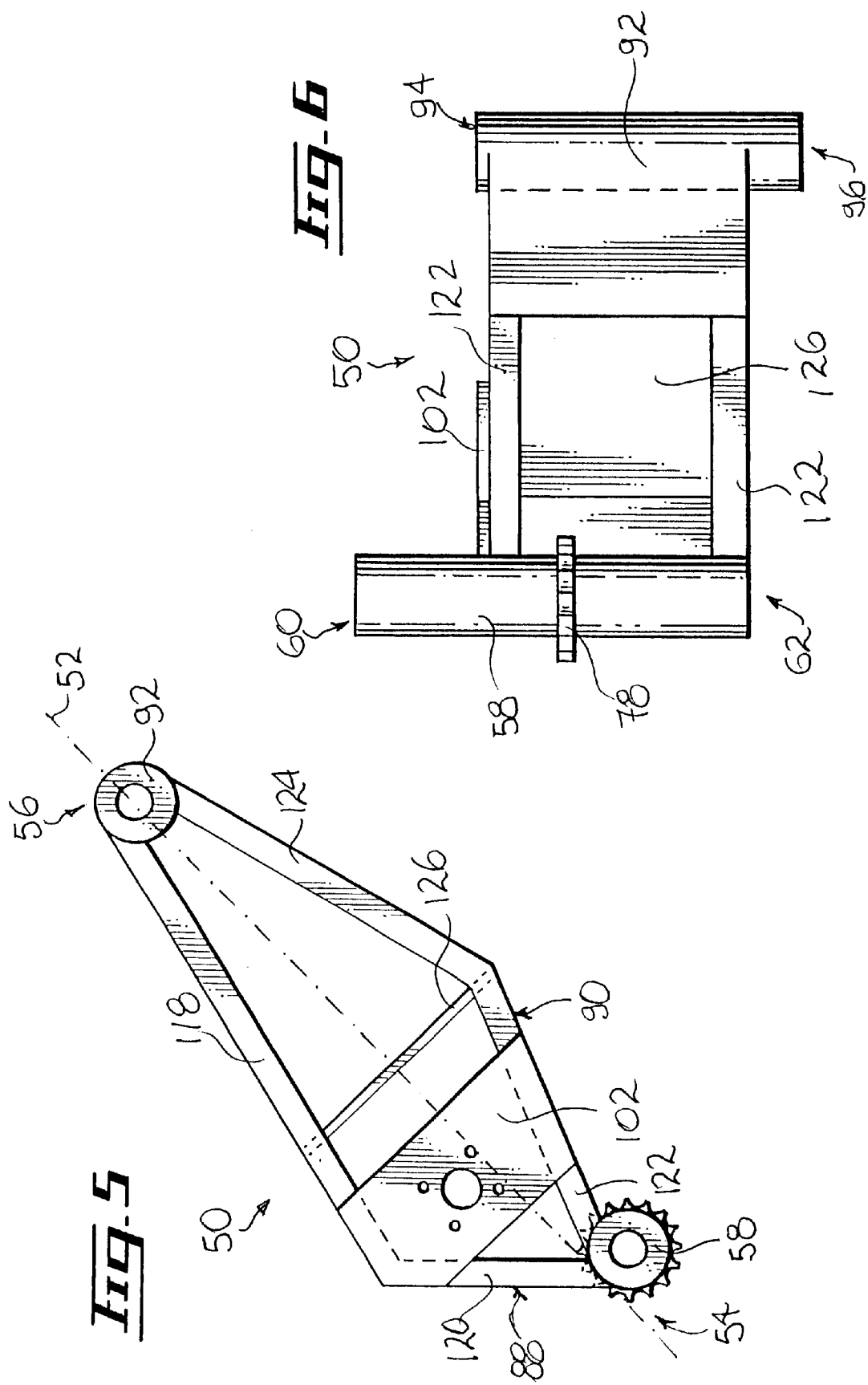

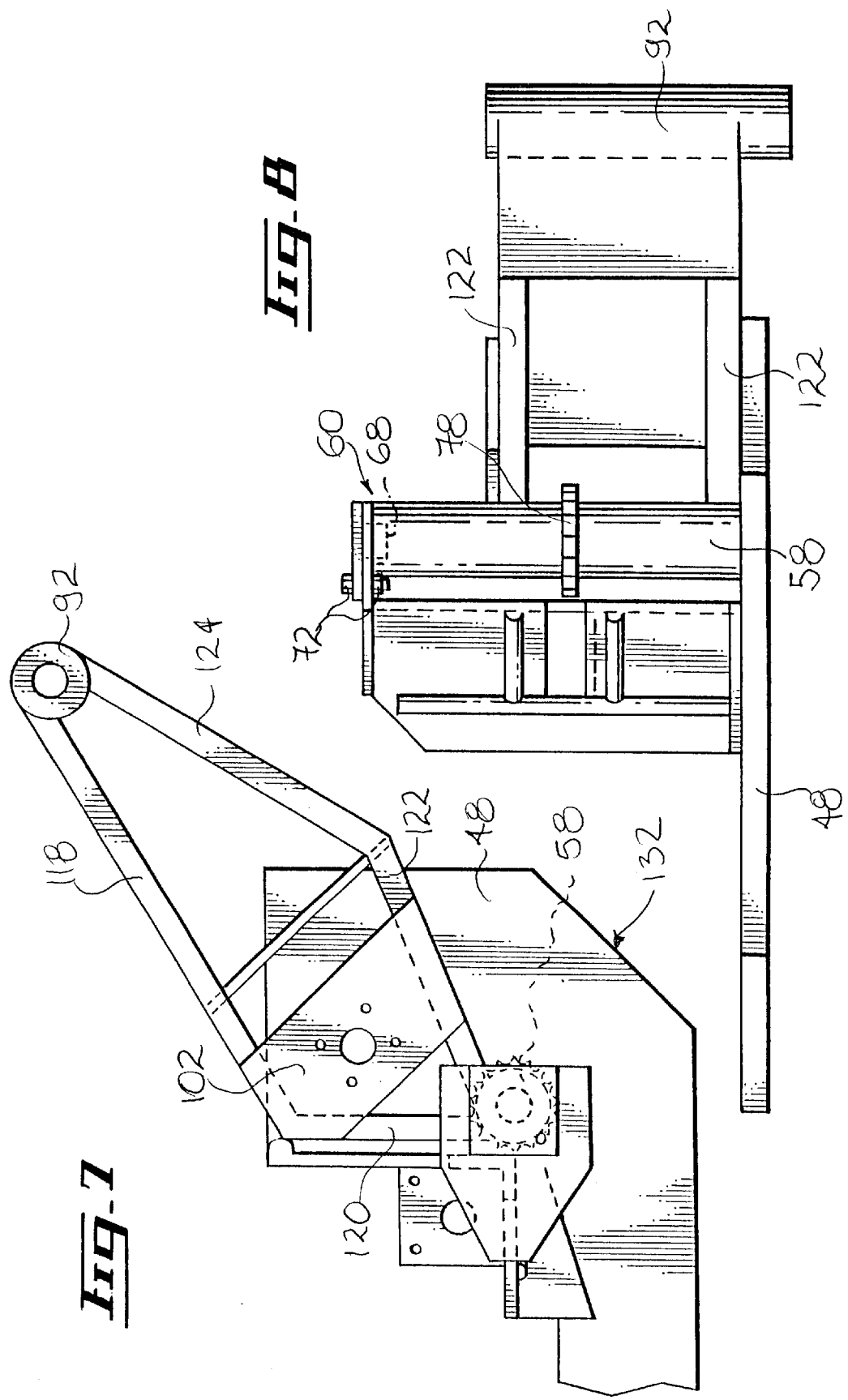

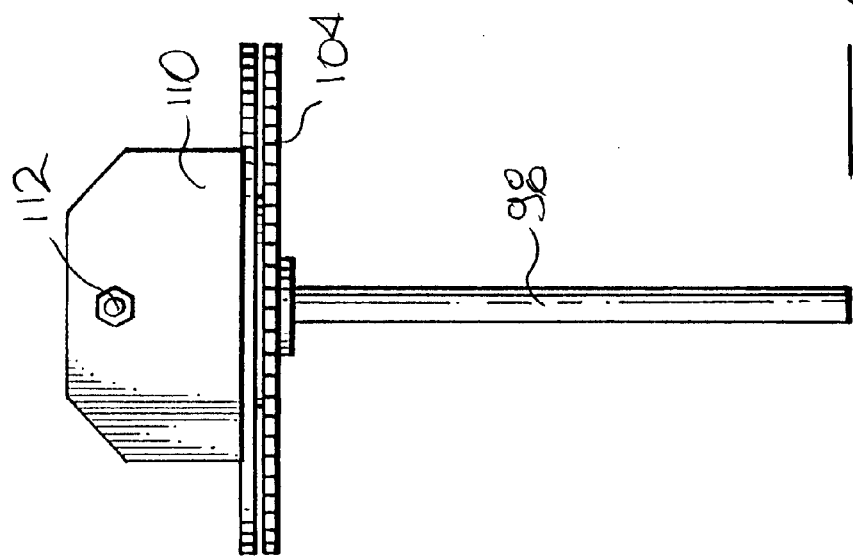
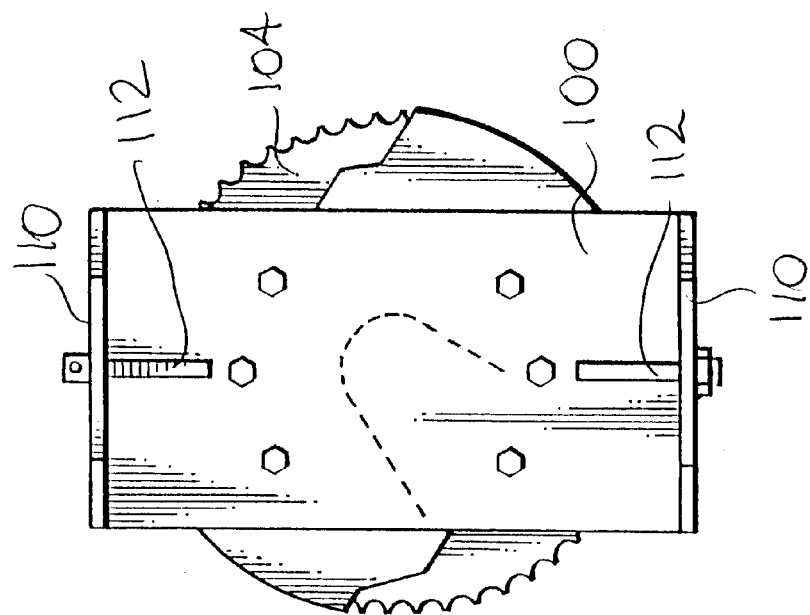

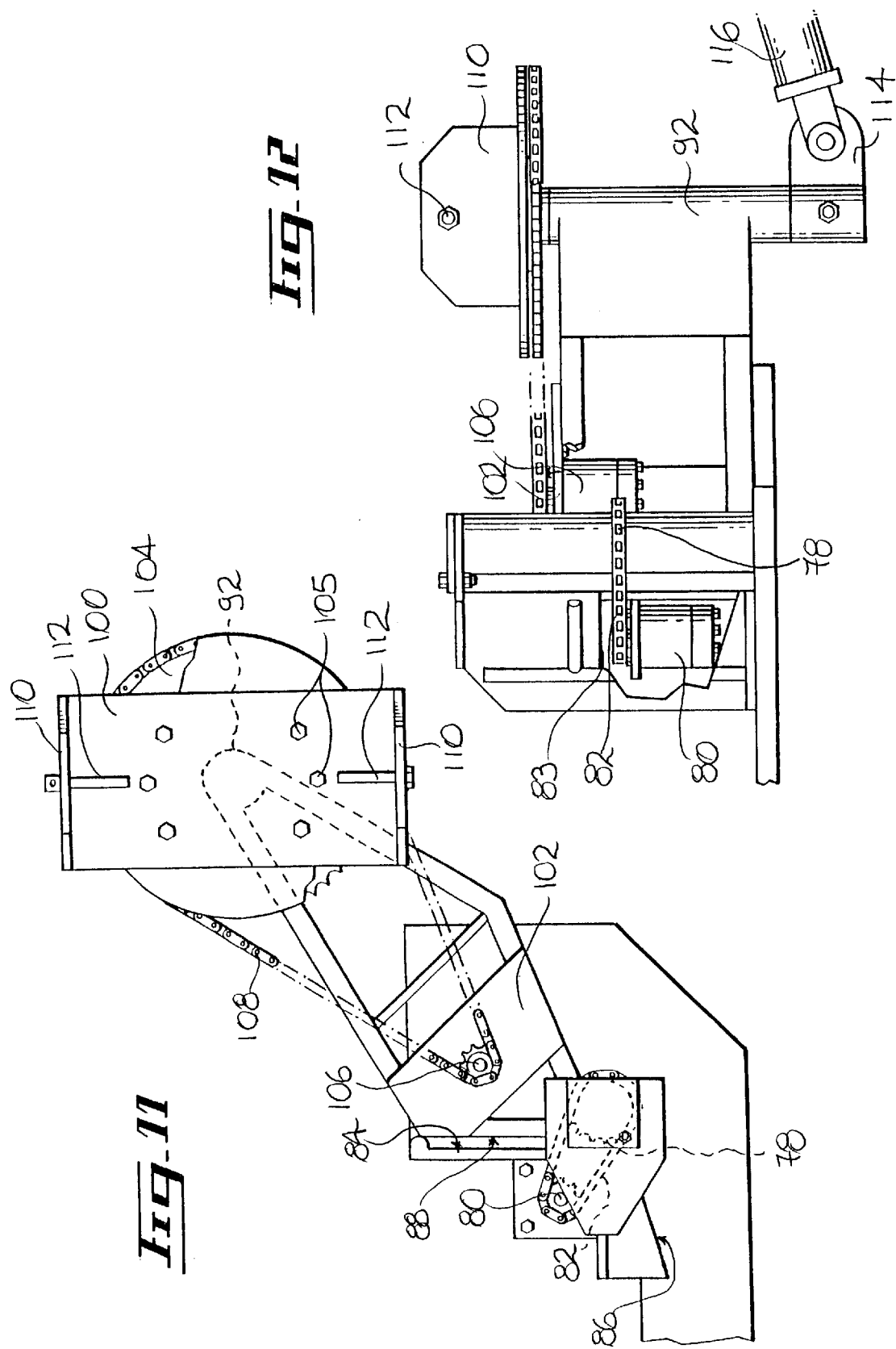

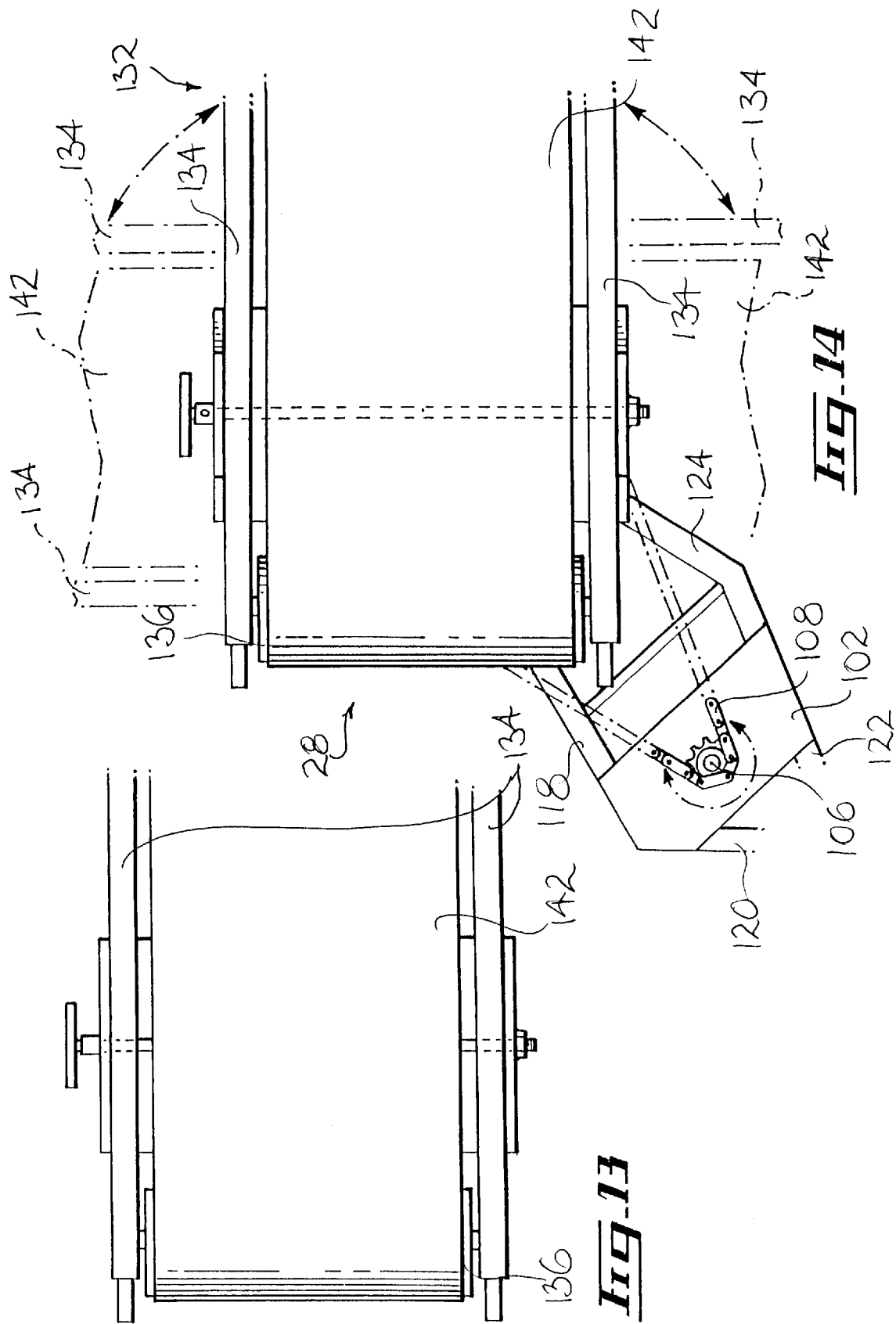

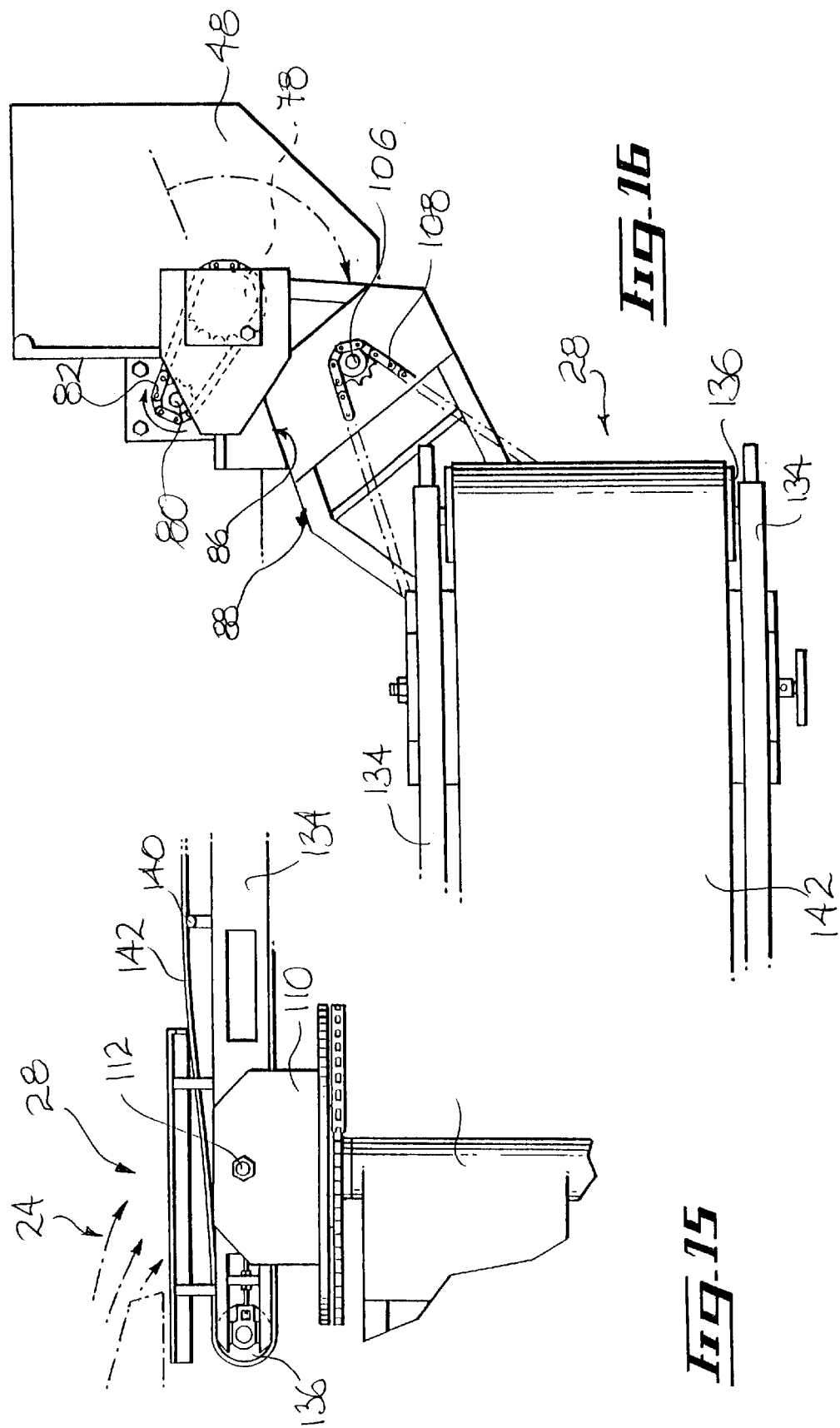

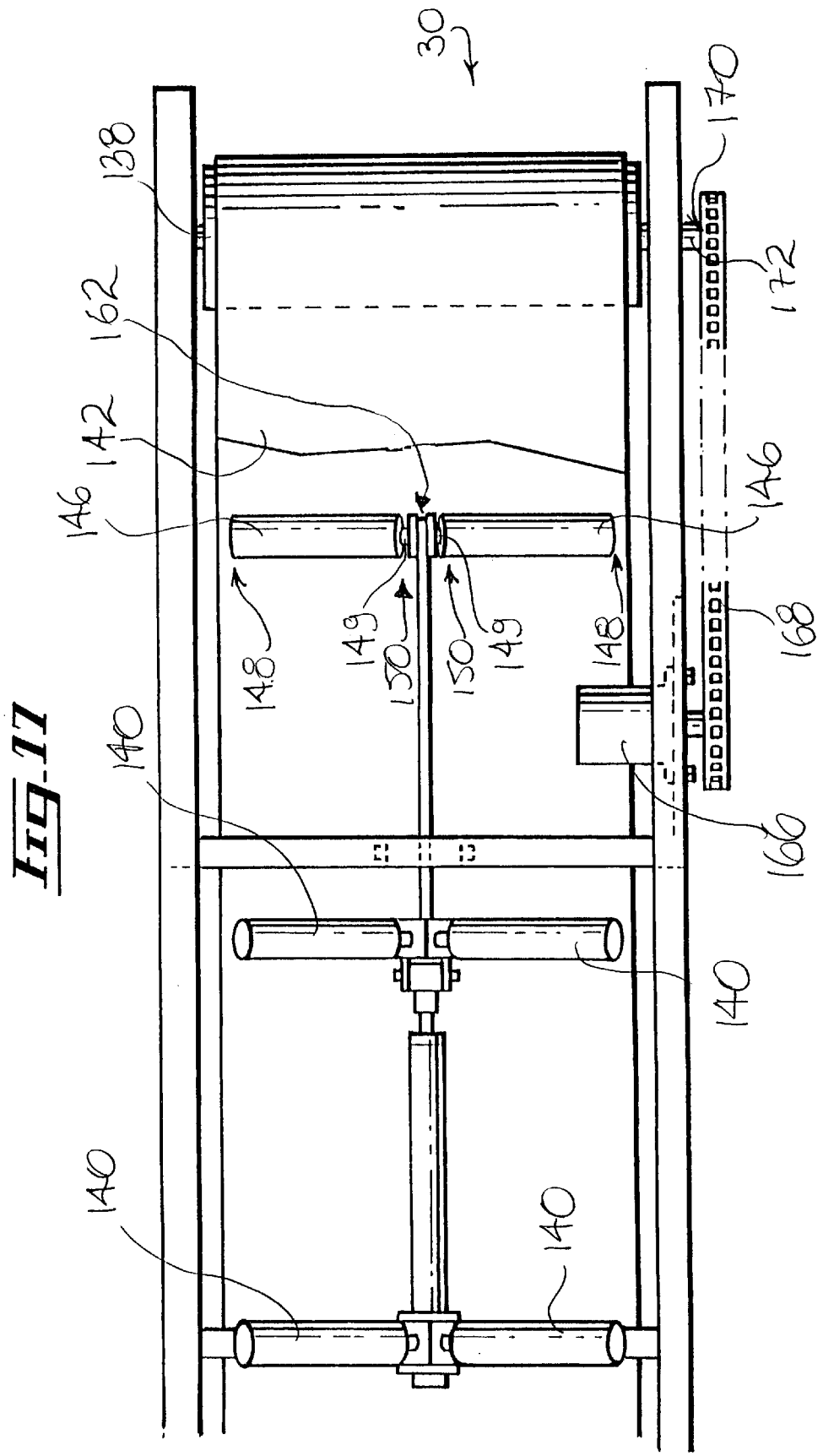

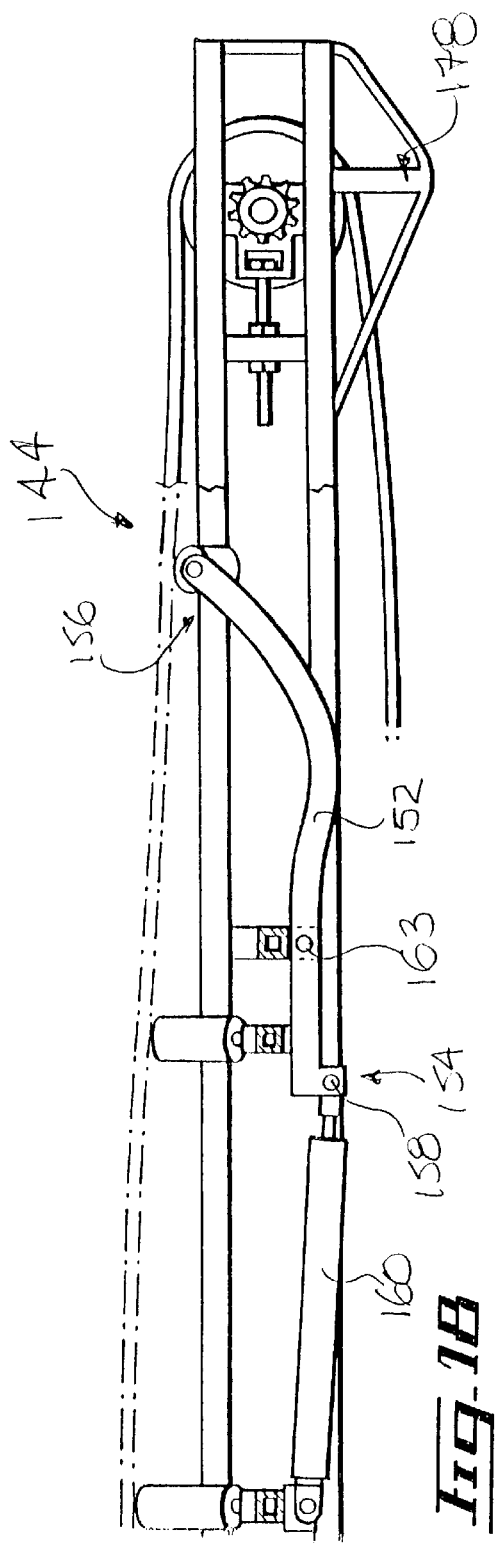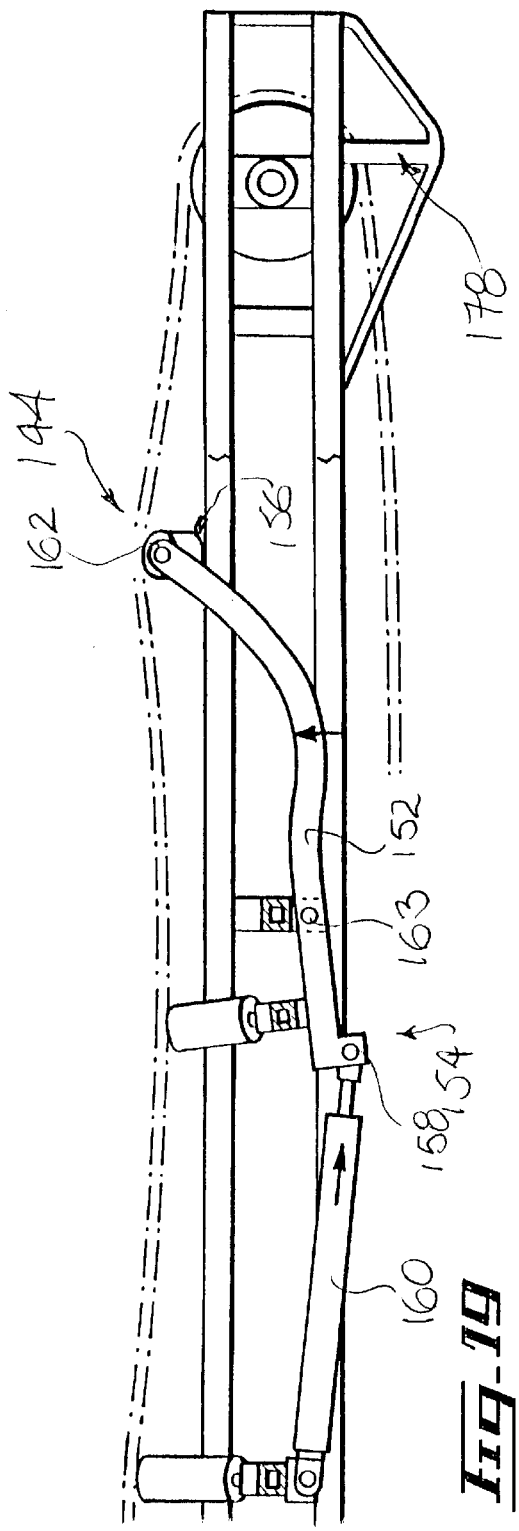

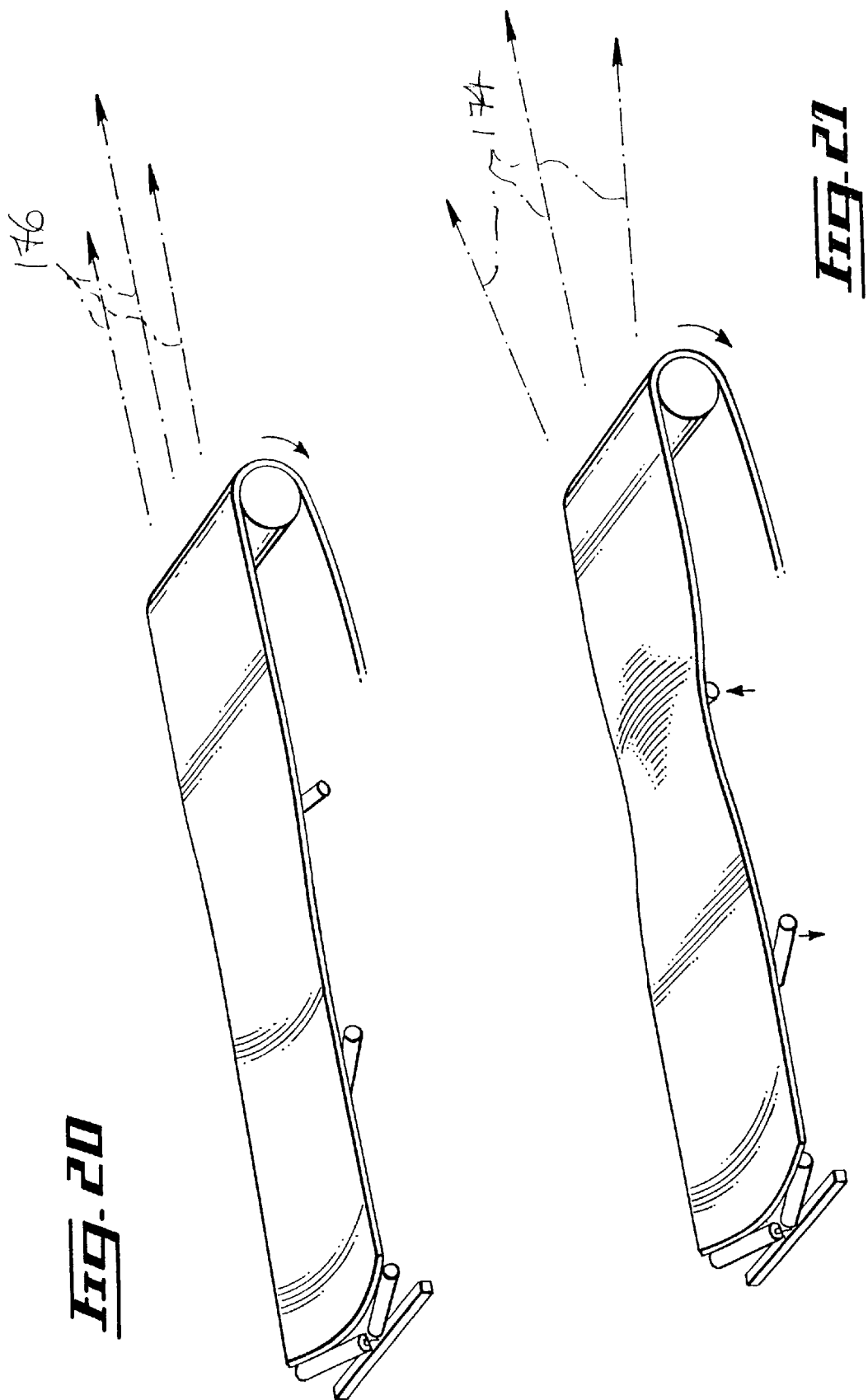

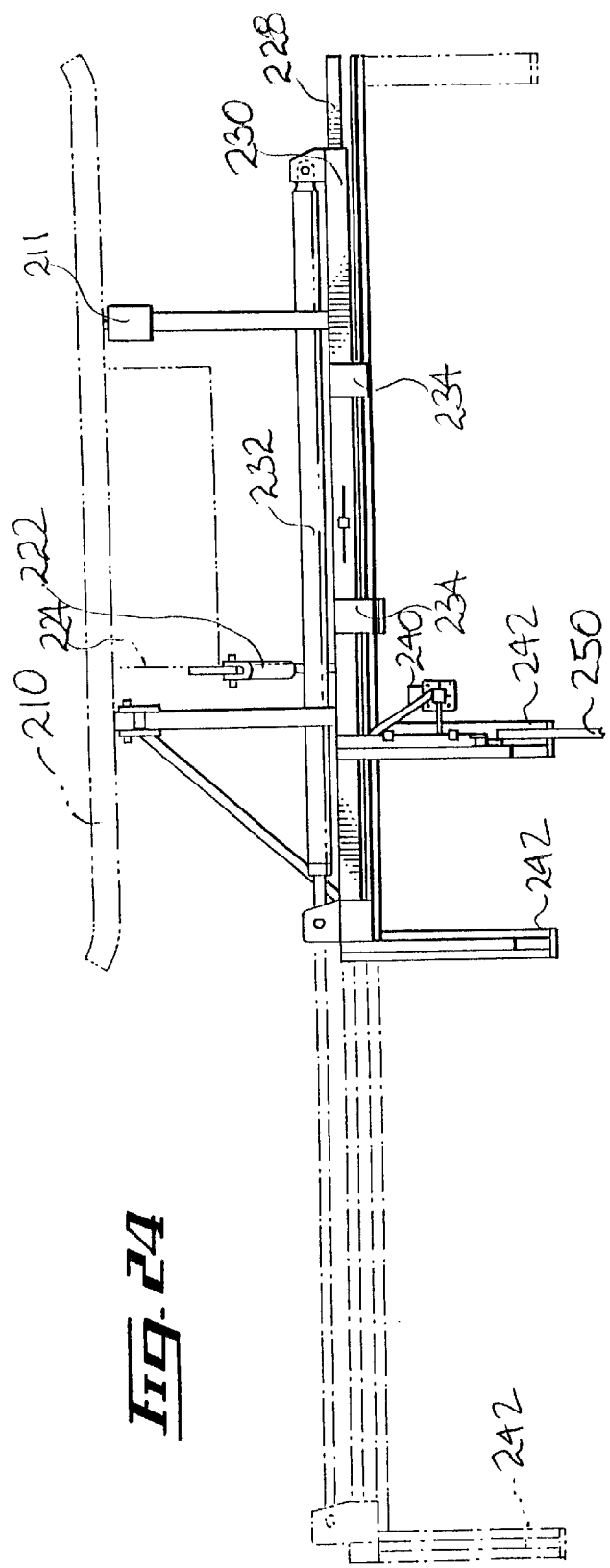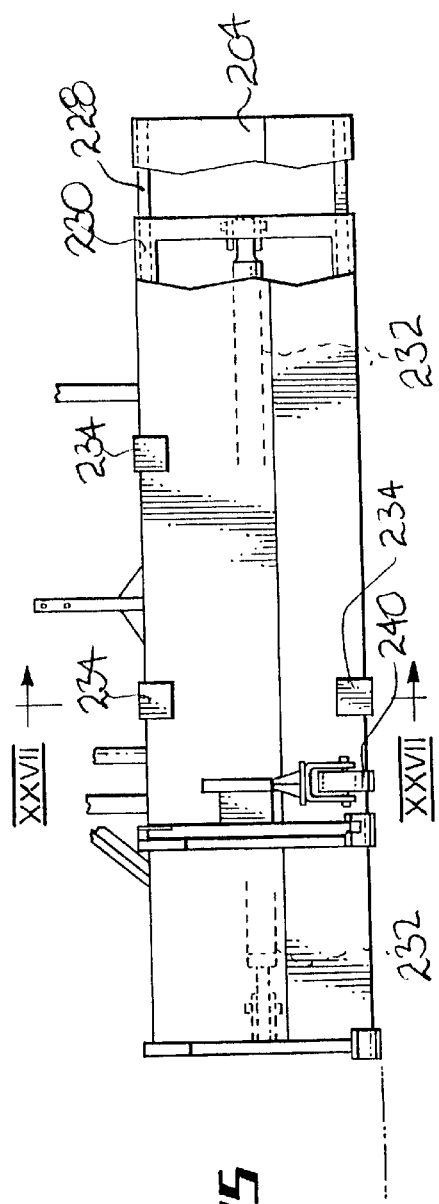

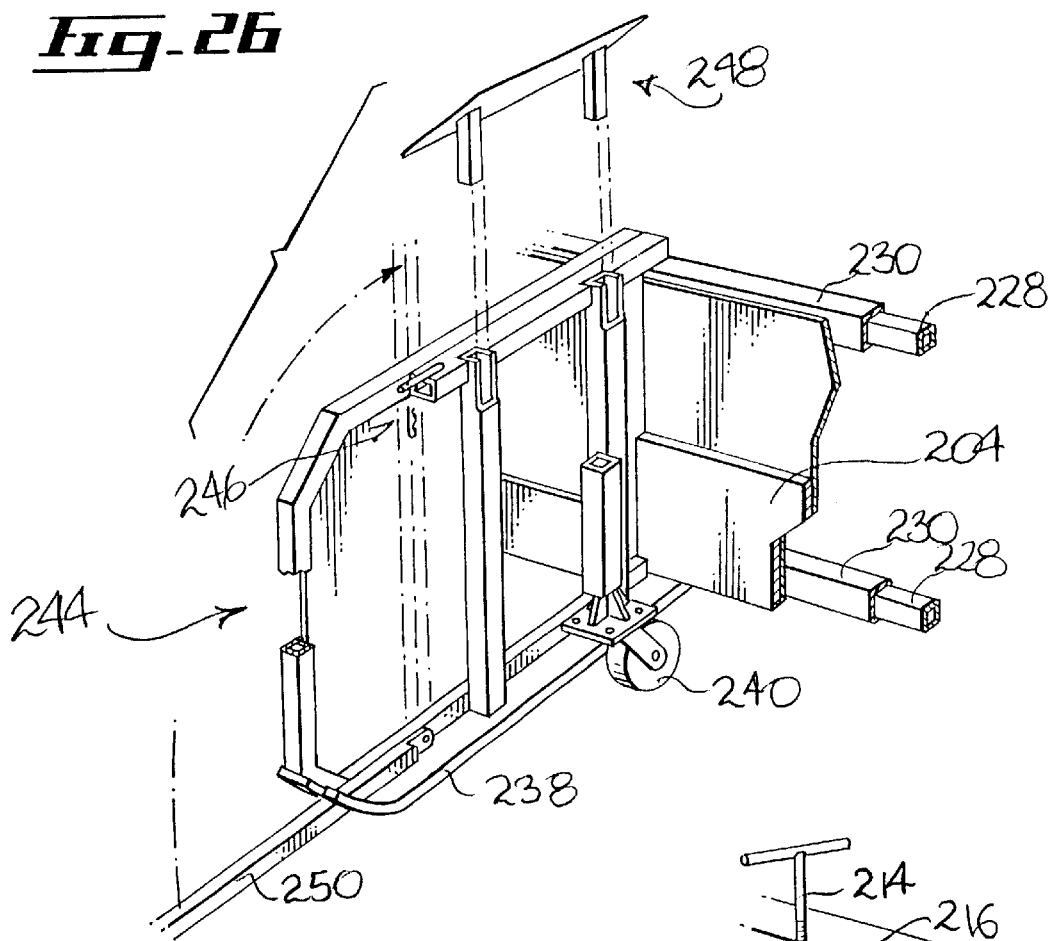
Fig. 26
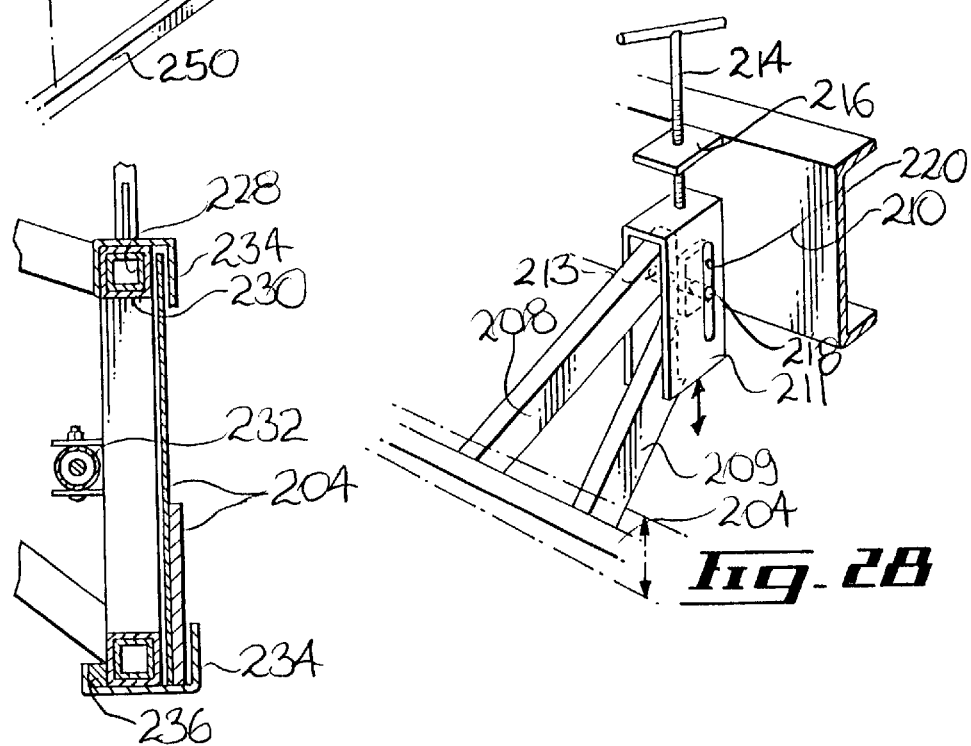
Fig. 27
Fig. 28

VEHICLE DISPENSING SYSTEM

FIELD OF THE INVENTION:

The present invention relates to the field of dispensing systems and is particularly concerned with an adjustable dispensing system for mounting on the front end of transportation vehicles.

BACKGROUND OF THE INVENTION:

There exists a variety of situations wherein it is desirable to transport loose bulk material such as gravel, loose salt, rocks or the like to a specific site and dispense the material at a predetermined location according to a predetermined dispensing pattern. For example, gravel and compacted stones are often required for the construction of roads, driveways and the like. Such loose bulk material is also often spread alongside the peripheral border of highways, country roads and the like.

So called dump trucks are typically used for transporting the loose bulk or granular material from a quarry or purchasing site to a dispensing site. Once at the dispensing site the truck dumps the load of material at the location nearby the worksite. The load is then shoveled to the actual worksite. This two-step procedure is not only tedious and time consuming but also leads to waste of construction material.

These problems have been heretofore recognized and, hence, several vehicle dispensing systems have been disclosed in the prior art. One particular popular prior art system includes a hopper strap on the back of a dump truck. The conveyor runs from the bottom of the hopper, out the back of dump truck, to a spreader suspended at the end of the conveyor.

While the above modification to existing dump trucks facilitates their conversion for dispensing granular material such as gravel or for sanding purposes in the wintertime, it will be appreciated that the visibility of the rear mounted spreading apparatus is limited with respect to the driver of the vehicle. Indeed, there is no ability for the driver to inspect the material carried by the conveying system during spreading. Also, frequently, the operator cannot see activities behind the truck because the body of the truck may block the view. This creates a considerable potential for injury to people located nearby the truck. Furthermore, regardless of the type of dispensing system used, rear dispensing trucks must be backed up to a worksite such that the front end of the truck may block traffic or otherwise interfere with the surrounding environment.

Another main drawback associated with prior art structures relates to the lack of versatility with regards to the configuration dispensing spray pattern. Indeed, most prior art devices using conveyors as dispensing systems have conveyors belts with either a flat or generally concave cross-sectional configuration. The configuration of the conveyor belt adjacent the discharge end thereof is fixed and, hence, the dispensing system can only create one type of spray pattern. This lack of versatility in the type of dispensing spray patterns often leads to the necessity for second step maneuvers such as requiring further processing of the dispensed material with rakes or other machinery. The lack of versatility in the type of dispensing spray pattern also leads to a lack of versatility in the type of dispensing operations they can perform. In other words, they are not adapted to vary their operational characteristics according to the type of work being needing to be performed. For example, while some prior art devices are capable of forming a dispensing spray pattern suitable for sanding roads, the same type of device is inadequate for dispensing gravel alongside the roads.

A still further disadvantage related to prior art devices, is that most of them suffer from limited adjustability in the spatial positioning of the discharge area. Indeed, the discharge area of most prior art devices is often in a fixed relationship relative to the vehicle on which the dispensing device is mounted. This, in turn, also leads to the need for additional processing of the material once sprayed or for the need for complicated driving maneuvers.

Furthermore, most prior art devices are so configured that they can only be used for dispensing purposes without any concomitant processing of the discharged material. In some situations such as when gravel is being spread alongside roads it is often desirable to even the top surface of the gravel by a plough or other means so as to form a generally smooth surface. Typically, the prior art systems unsuited for performing any type of processing on the material being dispensed require that a second vehicle even the gravel once the latter has been sprayed, again creating a costly two step procedure.

Still further, some of the prior art vehicle dispensing systems, form a relatively bulky and cumbersome structure when not in use and, thus, substantially impair the maneuverability of the vehicle to which they are attached. Also, some of the prior art vehicle dispensing systems are relatively mechanically complex leading to lack of reliability and high maintenance costs.

Accordingly, there exists a need for an improved dispensing system for flowable material transportation vehicles.

The proposed invention allows for the provision of a front discharge material transporting and dispensing vehicle. The proposed system is specifically designed so as to be mounted to the front end of a transportation vehicle such as a truck so as to allow for improved visibility of the material as it is being dispensed. The mounting of the device to the front of the vehicle also reduces the risks of accidents and increases the ergonomic features of the dispensing operation.

The proposed system also allows for the creation of various discharge spray patterns and for the relatively precise positioning of the discharge outlet, increasing the overall versatility of system and reducing the need for further processing of the dispensed material. The proposed system is provided with optional built-in ploughing means for allowing processing of the material being dispensed by the same vehicle on which the system is mounted again increasing the overall versatility of system and reducing the need for further processing of the dispensed material.

Still further, the proposed device is specifically designed so as to be manufacturable using conventional forms of manufacturing thus providing thus providing a dispensing system which will be economically feasible, long lasting and relatively trouble free in operation.

In accordance with an embodiment of the invention,there is a material dispensing system for use with a flowable material delivering vehicle, the vehicle defining a vehicle front end and a vehicle rear end, the vehicle including a vehicle frame mounted on wheels, an operator cab mounted on the vehicle frame adjacent the vehicle front end, a material container mounted on the vehicle frame rearwardly relative to the operator cab, the material container having a bottom wall defining a container outlet aperture, a blocking gate for selectively blocking the container outlet aperture, the material dispensing system comprising: a fixed conveyor means, the fixed conveyor means being attached to the vehicle so as to extend from a position substantially underneath the container outlet aperture to a position located adjacent the vehicle front end, the fixed conveyor means defining a frontwardly positioned fixed conveyor discharge section; a dispensing adapter for selectively dispensing the flowable material emanating from the fixed conveyor discharge section at a predetermined location according to a predetermined dispensing pattern.

In one embodiment of the invention, a first dispensing adapter includes a pivotable conveyor means, the pivotable conveyor means having a generally elongated configuration defining a pivotable conveyor first end and a pivotable conveyor second end, the pivotable conveyor first end being pivotally attached to an aligning structure, the aligning structure being pivotally attached to the vehicle adjacent the vehicle front end; first pivoting means for pivoting the aligning structure about a substantially vertical first pivotal axis between a working position wherein the pivotable conveyor first end is substantially in register with the fixed conveyor discharge section and. a stowed position wherein the pivotable conveyor first end is positioned laterally relative to the fixed conveyor discharge section; second pivoting means for pivoting the pivotable conveyor about a substantially vertical second pivotal axis so that the trajectory of the pivotable conveyor second end forms a generally horizontal arc; whereby when the aligning structure is in the working position the pivotable conveyor can be used to discharge flowable material emanating from the fixed conveyor discharge section away from the vehicle through a predetermined arc and when the aligning structure is in the stowed position the pivotable conveyor can be pivoted to a lateral position substantially proximal and parallel to the vehicle frame.

Preferably, the first adapter further comprises a third pivoting means for pivoting the pivotable conveyor about a substantially horizontal third pivotal axis so that the trajectory of the pivotable conveyor second end forms a generally vertical arc.

Conveniently, the first pivoting means includes a supporting platform defining a platform base plate attached to the vehicle adjacent the vehicle front end; a linkage arm defining a linkage arm longitudinal axis, a linkage arm first end and an opposed linkage arm second end, the linkage arm first end being pivotally attached to the platform base plate and the pivotable conveyor first end being pivotally attached to the linkage arm second end; a first pivoting drive means mechanically coupled to both the supporting platform and the linkage arm for selectively pivoting the linkage arm relative to the supporting platform.

Preferably, the linkage arm is provided with a linkage arm first sleeve extending in a direction generally perpendicular to the linkage arm longitudinal axis, the linkage arm first sleeve defining a first sleeve first end and an opposed first sleeve second end; a substantially vertical platform mast extends from the platform base plate; a mast first mounting plate extends from an upper segment of the platform mast, the mast first mounting plate having a first axle stub extending perpendicularly therefrom, the first axle stub being inserted in the first sleeve first end; the platform base plate is provided with a second axle stub extending perpendicularly therefrom, the second axle stub being inserted in the first sleeve second end.

Conveniently, a mast second mounting plate extends from the platform mast intermediate the mast first mounting plate and the platform base plate; a first sleeve sprocket is mounted on the first sleeve; a first driving motor is attached to the mast second mounting plate, the first driving motor having a first driving chain mechanically coupled to the first sleeve sprocket.

Preferably, the platform mast defines a pair of angled mast abutment surfaces and the linkage arm defines a pair of arm abutment surfaces, the mast abutment surfaces and the arm abutment surfaces being configured and sized for abuttingly limiting the range of pivotal movement between the supporting platform and the linkage arm between the working and the stowed positions.

Conveniently, the linkage arm is provided with a linkage arm second sleeve positioned substantially opposite the linkage arm first sleeve and extending in a direction generally perpendicular to the linkage arm longitudinal axis, the linkage arm second sleeve defining a second sleeve first end and an opposed second sleeve second end; a pivotable conveyor axle is rotatably inserted in the linkage arm second sleeve; a pivotable conveyor attachment plate is solidly attached to the pivotable conveyor axle; a second pivoting drive means mechanically coupled to both the linkage arm and the pivotable conveyor axle for selectively pivoting the pivotable conveyor attachment plate relative to the linkage arm.

Preferably, a linkage arm mounting plate is fixed to the linkage arm intermediate the linkage arm first and second sleeves; an axle sprocket is mounted on the axle intermediate the second sleeve and the pivotable conveyor attachment plate; a second driving motor is attached to the linkage arm mounting plate, the second driving motor having a second driving chain mechanically coupled to the axle sprocket.

Preferably, the pivotable conveyor attachment plate is provided with a pair of mounting plate flanges extending substantially perpendicularly therefrom; a flange axle extends from at least one of the mounting plate flanges, the flange axle being rotatably attached to the pivotable conveyor means adjacent the pivotable conveyor first end; a third pivoting drive means is mechanically coupled to both the second sleeve and the pivotable conveyor for selectively pivoting the pivotable conveyor relative to the linkage arm about the flange axle.

Conveniently, a second sleeve mounting plate is fixed to the second sleeve opposite the pivotable conveyor attachment plate; a jack-type component is attached at a jack first end thereof to the second sleeve mounting plate and at a jack second end thereof to the pivotable conveyor distally relative to the flange axle.

Preferably, the pivotable conveyor means includes a generally elongated truss-like boom frame pivotally attached to the aligning structure, the boom frame including a pair of spaced apart side plates; first and second end drums rotatably mounted to the boom frame between the side plates respectively adjacent the pivotable conveyor first and second ends; intervening longitudinally spaced apart idler rollers; an endless conveyor belt extending around the first and second end drums and supported along the boom frame by the idler rollers; a belt configurating means for allowing the cross-sectional configuration of a predetermined longitudinal configurable section of the conveyor belt to be selectively changed between a generally concave cross-sectional configuration and a generally convex cross-sectional configuration.

Conveniently, the belt configurating means includes a pair of configurating rollers supporting at least a fraction of the configurable section, each of the configuration rollers having a corresponding configuration roller axle for allowing rotation of the configuration rollers about their respective longitudinal axis, each of the configuration rollers defining a configuration roller proximal end located relatively proximal to an adjacent side plate and a configuration roller distal end located relative distally relative to an adjacent side plate, the configuration roller distal ends being in a relatively proximal relationship relative to each other; a roller pivoting means attached to the configuration rollers for pivoting the configuration rollers between a concave configuration wherein the pair of configuration rollers extend at an angle from each other with the configuration roller distal ends positioned in a first geometrical plane located above the configuration roller proximal ends and a convex configuration wherein the pair of configuration rollers extend at an angle from each other with the configuration roller distal ends positioned in a second geometrical plane located underneath the configuration roller proximal ends.

Preferably, the roller pivoting means includes a rocker arm, the rocker arm defining a rocker arm proximal end and a rocker arm distal end, the rocker arm proximal end being attached by an arm-to-piston attachment means to the distal end of a piston-type component, the piston-type component being attached at a proximal end thereof to the boom frame; the rocker arm distal end being attached by an arm-to-roller attachment means to both the configuration roller distal ends; the rocker arm being pivotally attached intermediate the rocker arm proximal and distal ends to the boom frame by an arm-to-frame attachment means so as to allow the rocker arm to pivot about a generally horizontal rocker arm pivotal axis; the rocker arm being configured and sized such that linear movement of the piston-type component causes the rocker arm to pivot about the rocker arm pivotal axis and the pair of configuration rollers to pivot between the concave and convex configurations.

The dispensing system may also be provided with a second dispensing adapter, the second dispensing adapter includes a dispensing chute attached to the vehicle adjacent the vehicle front end; the dispensing chute defining a chute inlet end positioned adjacent the fixed conveyor discharge section, a laterally and downwardly extending chute body and a chute outlet end positioned laterally relative to the vehicle.

Preferably, the chute body includes a chute positioning means for allowing customized adjustment of the lateral positioning of the chute outlet end relative to the vehicle.

Conveniently, the dispensing adapter also includes a plough blade, the plough blade being attached to the vehicle by a plough attachment frame so that the plough blade is positioned laterally relative to the vehicle and rearwardly relative to the chute outlet.

Preferably, the plough attachment frame is provided with a plough angle adjustment means for allowing the selective adjustment of the angular relationship between the plough blade and a horizontal plane.

Conveniently, the plough attachment frame is provided with a plough raising and lowering means for allowing the selective raising and lowering of the plough blade.

Preferably, the plough attachment frame is provided with a plough width adjustment means for allowing the selective adjustment of the width of the plough blade.

In accordance with the present invention, there is also provided a material dispensing system in combination with a vehicle for delivering flowable material, the vehicle defining a vehicle front end and a vehicle rear end, the vehicle including a vehicle frame mounted on wheels, an operator cab mounted on the vehicle frame adjacent the vehicle front end, a material container mounted on the vehicle frame rearwardly relative to the operator cab, the material container having a bottom wall defining a container outlet aperture, a blocking gate for selectively blocking the container outlet aperture, the material dispensing system comprising: a fixed conveyor means, the fixed conveyor means being attached to the vehicle so as to extend from a position substantially underneath the container outlet aperture to a position located adjacent the vehicle front end, the fixed conveyor means defining a frontwardly positioned fixed conveyor discharge section; a dispensing adapter for selectively dispensing the flowable material emanating from the fixed conveyor discharge section at a predetermined location according to a predetermined dispensing pattern.

BRIEF DESCRIPTION OF THE DRAWINGS

An embodiment of the present invention will now be disclosed, by way of example, in reference to the following drawings, in which:

FIG. 1, in an elevation view with sections taken out, illustrates a vehicle with forwardly located adjustable dispensing conveyor in accordance with an embodiment of the present invention. The vehicle being shown in phantom lines and the dispensing conveyor being shown in an horizontal position, in full lines and in a vertically inclined position, in phantom lines;

FIG. 2, in an elevation view with sections taken out, illustrates a vehicle with forwardly located adjustable dispensing conveyor in accordance with an embodiment of the present invention. The vehicle being shown in phantom lines and the dispensing conveyor being shown in full lines in an axially and in a longitudinally oriented position and in phantom lines in horizontal pivoted position;

FIG. 3, in a top view, illustrates a supporting platform part of the forwardly located adjustable dispensing conveyor shown in FIGS. 1 and 2;

FIG. 4, in an elevation view, illustrates the supporting platform shown in FIG. 3;

FIG. 5, in a top view, illustrates a linkage arm part of the forwardly located adjustable dispensing conveyor shown in FIGS. 1 and 2;

FIG. 6, in an elevation view, illustrates a linkage arm shown in FIG. 5;

FIG. 7, in a top view, illustrates the linkage arm shown in FIGS. 5 and 6 mounted on the supporting platform shown in FIGS. 3 and 4;

FIG. 8, in an elevation view, illustrates the linkage arm shown in FIGS. 5 and 6 mounted on the supporting platform shown in FIGS. 3 and 4;

FIG. 9, in a top view, illustrates a conveyor axle component part of the forwardly located adjustable dispensing conveyor shown in FIGS. 1 and 2;

FIG. 10, in an elevation view, illustrates the conveyor axle component shown in Figure FIG. 11, in a top view, illustrates the conveyor axle component shown in FIGS. 9 and 10 mounted on the linkage arm shown in FIGS. 5 and 6, the linkage arm being, in turn, mounted on the supporting platform shown in FIGS. 3 and 4;

FIG. 12, in a elevation view, illustrates the conveyor axle component, supporting platform, and linkage arm arrangement shown in FIG. 11;

FIG. 13, in a partial top view with sections taken out, illustrates an inlet section part of the dispensing conveyor shown in FIGS. 1 and 2;

FIG. 14, in a partial top view with sections taken out, illustrates part of the dispensing conveyor inlet section shown in FIG. 13 mounted on the conveyor axle component, linkage arm and supporting platform arrangement shown in FIGS. 11 and 12. The inlet section of the dispensing conveyor being shown in a dispensing configuration;

FIG. 15, in a partial elevation view with sections taken out, illustrates the inlet section of the dispensing conveyor and the conveyor axle component, linkage arm and supporting platform arrangement shown in FIG. 14;

FIG. 16, in a partial top view with sections taken out, illustrates part of the dispensing conveyor inlet section shown in FIG. 13 mounted on the conveyor axle component, linkage arm and supporting platform arrangement shown in FIGS. 11 and 12. The inlet section of the dispensing conveyor being shown in a retracted configuration;

FIG. 17, in a partial top view with sections taken out, illustrates an outlet section part of the adjustable dispensing conveyor shown in FIGS. 1 and 2;

FIG. 18, in a partial elevation view with sections taken out, illustrates part of the outlet section of the adjustable dispensing conveyor shown in FIGS. 1 and 2 with the conveyor base in a generally flat configuration;

FIG. 19, in a partial elevation view with sections taken out, illustrates part of the outlet section of the adjustable dispensing conveyor shown in FIGS. 1 and 2 with the conveyor base in a generally convex configuration;

FIG. 20, in a partial perspective view with sections taken out, illustrates part of the outlet section of the adjustable dispensing conveyor shown in FIGS. 1 and 2 with its outlet section in a generally flat configuration thus providing a generally rectilinear spray pattern;

FIG. 21, in a partial perspective view with sections taken out, illustrates part of an outlet section of the adjustable dispensing conveyor shown in FIGS. 1 and 2 with its base in a generally convex configuration thus providing a substantially divergent spray pattern;

FIG. 25, in a top view illustrates a plow arrangement having a variable width;

FIG. 24, in a rear view illustrates a plough arrangement;

FIG. 26, in a rear perspective view illustrates a chute supporting component;

FIG. 27, in a cross-sectional view taken along arrows 27–27 of FIG. 25 illustrates some of the frame components part of the plough arrangement;

FIG. 28, in a partial perspective view illustrates a plough angle adjustment structure.

Figure 22:
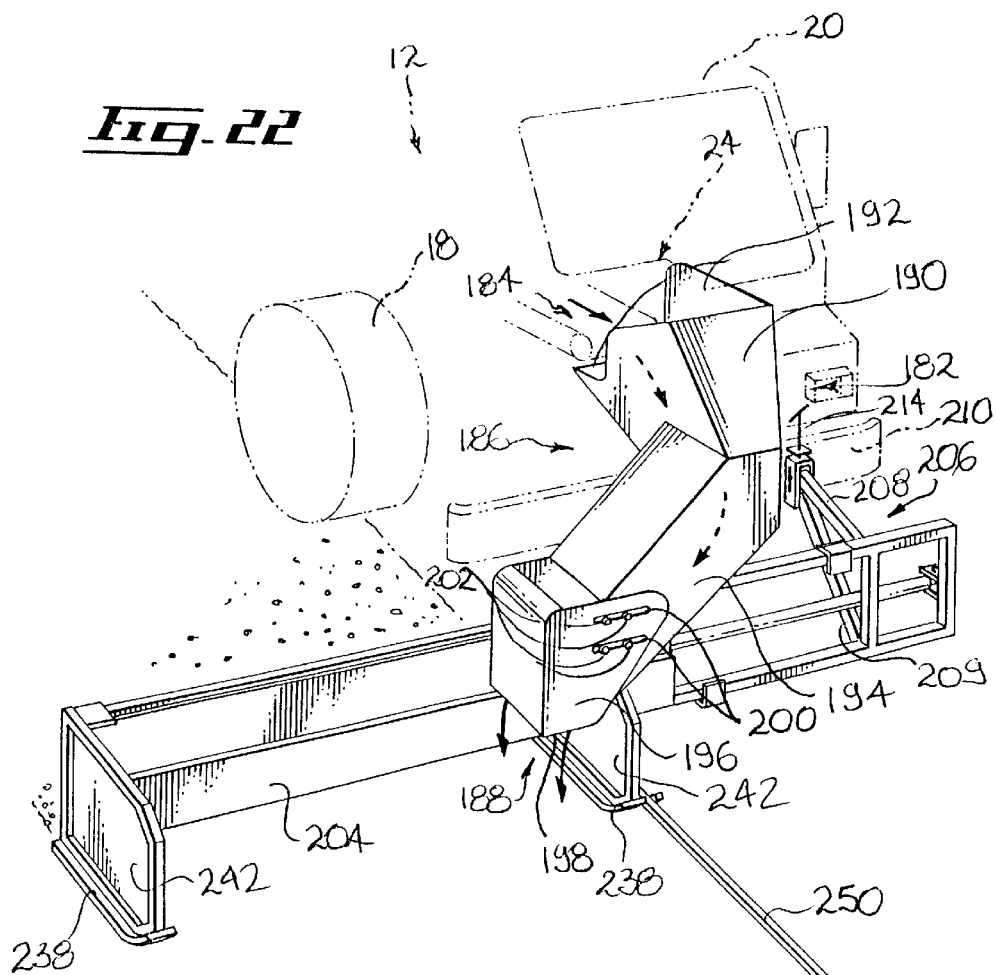
FIG. 22, in a perspective view illustrates a second dispensing adapter part of the present invention mounted to the front section of a vehicle.

DETAILED DESCRIPTION:

Referring to FIGS. 1 and 2, there is shown a material dispensing system 10 in accordance with an embodiment of the present invention. The material dispensing system 10 is shown attached to a conventional vehicle 12 such as a vehicle conventionally used for delivering flowable material. The flowable material may be of the granular type such as sand, gravel, small rocks or the like or any other suitable type such as semi-liquid or liquid material.

The vehicle 12 defines a vehicle front end 14 and a vehicle rear end 16. The vehicle 12 includes a vehicle frame mounted on wheels 18. An operator cab 20 is mounted on the vehicle frame adjacent the vehicle front end 14. A material container 23 such as a box like container, a hopper or the like is mounted on the vehicle frame rearwardly relative to the operator cab 20. The material container 23 is adapted to contain the flowable material and has a container bottom wall defining a container outlet aperture (not shown). A blocking gate (also not shown) is provided for selectively blocking the container outlet aperture.

The material dispensing system includes a fixed conveyor means 22. The fixed conveyor means 22 is attached to the vehicle 12 so as to extend from a position substantially underneath the container outlet aperture of the material container 23 to a position located adjacent the vehicle front end 14. The fixed conveyor means 22 defines a frontwardly positioned fixed conveyor discharge section 24.

The material dispensing system 10 also includes a dispensing adapter for selectively dispensing the material emanating from the fixed conveyor discharge section 24 to a predetermined location and according to a predetermined discharge pattern. A first dispensing adapter is shown in FIGS. 1 through 21.

The first dispensing adapter includes a pivotable conveyor 26. The pivotable conveyor 26 has a generally elongated configuration defining a pivotable conveyor first or proximal end 28 and an opposed pivotable conveyor second or distal end 30. The pivotable conveyor first end 28 is pivotally attached by suitable means to an aligning structure 32. The aligning structure 32, in turn, is pivotally attached to the vehicle 12 adjacent the vehicle front end 14.

A first pivoting means is provided for pivoting the aligning structure 32 about a substantially vertical first pivotal axis 34 as indicated by arrow 36 in the FIG. 2. The first pivoting means is adapted to pivot the aligning structure 32 about the first pivotal axis 34 between a working position shown in full lines in FIG. 2, wherein the pivotable conveyor first end 28 is substantially in register with the fixed conveyor discharge section 24 and a stowed position illustrated in phantom lines in FIG. 2, wherein the pivotable conveyor first end 28 is positioned laterally relative to the fixed conveyor discharge section 24. The positioning of the first pivoting means in the working and stowed positions is illustrated in greater details respectively in FIGS. 11 and 16.

A second pivoting means is also provided for pivoting the pivotable conveyor 26 about a substantially vertical second pivotal axis 38. The second pivoting means allows the pivotable conveyor 26 to pivot about the second pivotal axis 38 in such a manner that the trajectory of the pivotable conveyor second end 30 forms a generally horizontal arc.

The horizontal pivotal movement of the pivotable conveyor 26 about the second pivotal axis 38 is indicated by arrows 40 in FIG. 2.

The respective pivotal movements about the first and second pivotal axis 34, 38 are such that when the aligning structure 32 is in the working position, the pivotable conveyor 26 can be used to discharge the flowable material emanating from the fixed conveyor discharge section 24 away from the vehicle 12 through a predetermined arc typically having a value substantially in the range of 180 degrees. Also, the respective pivotal movements about the first and second pivotal axis 34, 38 are such that when the aligning structure 32 is in the stowed position, the pivotable conveyor 26 can be pivoted to a lateral position substantially proximal and parallel alongside the vehicle frame so as to minimize obstruction to the potentially moving vehicle 12.

A third pivoting means is preferably further provided for pivoting the pivotable conveyor 26 about a substantially horizontal third pivotal axis 42. Pivotal movement of the pivotable conveyor 26 about the third pivotal axis 42 is such that the trajectory of the pivotable conveyor second end 30 forms a generally vertically oriented arc as indicated by the reference numeral 44 in FIG. 1.

Referring now more specifically to FIGS. 3 through 8 there is shown in greater details some of the components of the first pivoting means. The first pivoting means preferably includes a supporting platform isolated in FIGS. 3 and 4 and generally indicated by the reference numeral 46. The supporting platform 46 defines a platform base plate 48 adapted to be attached to the vehicle 12 adjacent the vehicle front end 14.

The first pivoting means also includes a linkage arm isolated in FIGS. 5 and 6 and generally designated by the reference numeral 50. The linkage arm 50 defines a linkage arm longitudinal axis 52, a linkage arm first or proximal end 54 and an opposed linkage arm second or distal end 56.

The linkage arm first end 54 is pivotally attached to the platform base plate 48 while the pivotable conveyor first end 28 is pivotally attached to the linkage arm second end 56. A first pivoting drive means mechanically coupled to the supporting platform 46 and the linkage arm 50 is also provided for selectively pivoting the linkage arm 50 relative to the supporting platform 46.

Preferably, the linkage arm 50 is provided with a linkage arm first sleeve 58 extending in a direction generally perpendicular to the linkage arm longitudinal axis 52. The linkage arm first sleeve 58 defines a first sleeve first end 60 and a longitudinally opposed first sleeve second end 62.

A substantially vertical platform mast 64 extends from the platform base plate 48 preferably upwardly therefrom. A mast first mounting plate 66 extends from an upper segment of the platform mast 64. The mast first mounting plate 66 has a first axle stub 68 extending perpendicularly therefrom. The first axle stub 68 is adapted to be inserted in the first sleeve first end 60 as shown in FIG. 8.

Typically, the first axle stub 68 extends through corresponding plate stub aperture 71 from an auxiliary plate 70 releasably mounted to the mast first mounting plate 66 using conventional fastening means such as a bolt and nut arrangement 72. The use of the auxiliary plate 70 facilitates installation as well as maintenance of the linkage arm 50. The platform base plate 48 is preferably provided with a second axle stub (not shown) extending perpendicularly therefrom preferably through a corresponding stub aperture 74. The second axle stub is adapted to be inserted in the first sleeve second end 62 for rotatably securing the linkage arm 50 to the supporting platform 46.

Preferably, a mast second mounting plate 76 extends from an inner surface of the platform mast 64 intermediate the mast first mounting plate 66 and the platform base plate 48. A first sleeve sprocket 78 is mounted on the first sleeve 58 so as to protrude laterally therefrom. As shown in FIGS. 11 and 12, a first driving motor 80 is attached to the mast second mounting plate 76. The first driving motor 80 is mechanically coupled by a corresponding first driving chain 82 extending through a mast aperture 83 to the first sleeve sprocket 78.

Preferably, the platform mast 64 defines a pair of angled mast abutment surfaces 84, 86 and the linkage arm 50 defines a pair of corresponding arm abutment surfaces 88, 90. The mast abutment surfaces 84, 86 and the arm abutment surfaces 88, 90 are configured and sized for abuttingly limiting the range of pivotal movement between the linkage arm 50 and the supporting platform 46 between the working and stowed positions as respectively illustrated in FIGS. 11 and 16.

As shown in FIGS. 5 through 8, the second pivoting means typically includes a linkage arm second sleeve 92 attached to the linkage arm 50. The linkage arm second sleeve 92 is positioned substantially opposite the linkage arm first sleeve 58. The linkage arm second sleeve 92 also preferably extends in a direction generally perpendicular to the linkage arm longitudinal axis 52. The linkage arm second sleeve 92 defines a second sleeve first end 94 and a longitudinally opposed second sleeve second end 96.

Referring now more specifically to FIGS. 9 through 12, there is shown that a pivotable conveyor axle 98 is adapted to be inserted in the linkage arm second sleeve 92. A pivotable conveyor attachment plate 100 is solidly attached to the pivotable conveyor axle 98. A second pivoting drive means is mechanically coupled to both the linkage arm 50 and the pivotable conveyor axle 98 for selectively pivoting the pivotable conveyor attachment plate 100 relative to the linkage arm 50 about the second pivotal axis 38.

Preferably, a linkage arm mounting plate 102 is fixed to the linkage arm 50 intermediate the linkage arm first and second sleeve 58, 92. An axle sprocket 104 is preferably mounted on the conveyor axle 98 intermediate the second sleeve 92 and the pivotable conveyor attachment plate 100. A second driving motor 106 is attached to the linkage arm mounting plate 102. The second driving motor 106 is mechanically coupled by a second driving chain 108 to the axle sprocket 104 for pivoting the pivotable conveyor attachment plate 100 attached thereto by bolts 105.

The third pivoting means typically includes a pair of mounting flanges 110 extending substantially perpendicularly from opposed peripheral edges of the conveyor attachment plate 100 so that the combination of the pivotable conveyor attachment plate 100 and the mounting plate flanges 110 form a yoke. A flange axle 112 extends from at least one of the mounting plate flanges 110. The flange axle 112 is rotatably attached to the pivotable conveyor means adjacent the pivotable conveyor first end 28. A third pivoting drive means is mechanically coupled to both the second sleeve 92 and the pivotable conveyor 26 for selectively pivoting the pivotable conveyor 26 relative to the linkage arm 50 about the flange axle 112. In a preferred embodiment of the invention, a flange axle 112 extends inwardly from each mounting plate flange 110.

Preferably, a second sleeve mounting plate 114 is attached to the second sleeve 92 opposite the pivotable conveyor attachment plate 100. A biasing component such as a jack-type piston component 116 is attached at a jack first end thereof to the second sleeve mounting plate 114 and at a jack second end thereof to the pivotable conveyor 26 preferably distally relative to the flange axle 112.

Referring back to FIGS. 5 and 6, there is shown that the linkage arm 50 preferably has a generally trapezoidal configuration defined by a pair of linkage arm frame structures maintained in a vertically spaced relationship relative to each other. Each linkage arm frame structure typically includes a first linkage rod 118 attached at a longitudinal end thereof to the second sleeve 92. The opposite end of the linkage first rod 118 bends integrally into a second and shorter linkage rod 120. The distal end of the second linkage rod 120 is solidly attached to the first linkage sleeve 58.

A third linkage rod 122 merges integrally with the distal end of the second linkage rod 120 and with the first linkage sleeve 58. The third linkage rod 122 is in a generally substantially parallel relationship with the first linkage rod 118. A fourth linkage rod 124 extends integrally from the distal end of the third linkage rod 122. The distal end of the fourth linkage rod 124 merges integrally with the outer surface of the second linkage sleeve 92 in a generally diametrically opposed relationship relative to the connection between the first linkage rod 118 and the second linkage sleeve 92.

A reinforcement plate 126 extends between the merger between the third and fourth linkage rods 122, 124 and an intermediate section of the first linkage rod 118. The reinforcement plate 126 is in a generally perpendicular relationship relative to the linkage rod longitudinal axis 52.

As shown in FIGS. 3 and 4, preferably the platform base plate 48 has a generally "L" shaped configuration with beveled corners 131,132 defining a pair of base abutment surfaces 128, 130 adapted to respectively abuttingly contact the side and front surfaces of the front end 14 of the vehicle 12.

The pivotable conveyor means preferably includes a generally elongated truss-like boom frame 132 pivotally attached to the aligning structure 32. The boom frame 132 typically includes a pair of spaced apart side plates 134. First and second end drums 136, 138 are rotatably mounted to the boom frame 132 between the side plates 134 respectively adjacent the pivotable conveyor first and second ends 28, 30. Intervening longitudinally spaced apart idler rollers 140 also extend between the side plates 134. An endless conveyor belt 142 extends around the first and second end drums 136, 138 and is supported along the boom frame 132 by the idler rollers 140.

A drum driving means is preferably provided for driving the first and/or second end drums 136, 138. The drum drive means typically takes the form of a drum driving motor 166 attached to one of the side plates 134. As shown in FIG. 17, a drum driving chain 168 extends around a drum driving motor sprocket part of the drum driving motor 166 and around a drum driven sprocket 170 attached to an axle 172 of the first and/or second end drums 136, 138.

One of the main features of the present invention resides in the presence of a belt configurating means for allowing the cross sectional configuration of a predetermined longitudinal configurable section 144 of the conveyor belt 142 to be selectively changed between a generally concave cross sectional configuration and a generally convex cross sectional configuration.

The belt configuration means typically includes at least one pair of configurating rollers 146 supporting at least a fraction of the configurable section 144. Each of the configuration rollers 146 preferably has a corresponding configuration roller axle 149 for respectively allowing rotation of the configuration rollers 146 about their respective longitudinal axis.

Each of the configuration rollers defines a configuration roller proximal end 148 located relatively proximal to an adjacent side plate 134 and a configuration roller distal end 150 located relatively distally relative to an adjacent side plate 134. The configuration roller distal ends 150 part of each pair of configuration rollers are thus in a relatively proximal relationship relative to each other.

The belt configuration means further includes a roller pivoting means attached to the configuration rollers 146 for pivoting the configuration rollers 146 between a concave configuration wherein a pair of configuration rollers extend at an angle from each other with the configuration roller distal ends 148 positioned in a first geometrical plane located above the configuration roller proximal ends 150 and a convex configuration wherein the pair of configuration of rollers 146 extend at an angle from each other with the configuration roller distal ends 148 in a second geometrical plane located underneath the configuration roller proximal ends 150.

The roller pivoting means preferably includes a rocker arm 152. The rocker arm 152 defines a rocker arm proximal end 154 and an opposed rocker arm distal end 156. The rocker arm proximal end 154 is attached by an arm-to-piston attachment means 158 to the distal ends of an arm piston-type component 160. The arm piston-type component 160 is attached at a proximal end thereof to a section of the boom frame 132.

The rocker arm distal end 156 is attached by an arm-to-roller attachment means 162 to both the configuration roller distal ends 148. The rocker arm 152 is pivotally attached intermediate the rocker arm proximal and distal ends 154, 156 to the boom frame 132 by an arm-to-frame attachment means 163 so as to allow the rocker arm 152 to pivot about a generally horizontal rocker arm pivotal axis 164.

The rocker arm 152 is configured and sized such that the linear movement of the arm piston-type component 160 causes the rocker arm 152 to pivot about the rocker arm pivotal axis 164 and the pair of configuration rollers 146 to pivot between the concave and convex configurations. The arm-to-roller attachment means 162 is thus adapted to allow pivotal movement of the configuration rollers 146 relative to the rocker arm 152 in a geometrical plane substantially perpendicular to the latter.

Movement of the configuration rollers 146 between their concave and convex configuration is adapted to respectively form a concavity or a bulge in the conveyor belt 142. When a bulge is formed in the conveyor belt 142 adjacent the pivotable conveyor second end 30 the material transported by the belt 142 is projected according to a generally divergent spray pattern as shown by arrows 174 in FIG. 21. Conversely, when the conveyor belt 142 forms a generally concave surface adjacent the pivotable conveyor second end 30 the display pattern is relatively narrow. In an intermediate position shown in FIG. 20, the configuration rollers 146 are configured relative to each other such that the conveyor belt 142 is relatively flat in the region of the pivotable conveyor second end 30 thus forming a generally straight spray pattern schematically indicated by the arrows 176.

The pivotable conveyor second end 30 is preferably provided with a ground abutting structure 178 extending downwardly from the boom frame 132. The ground abutment structure 178 is adapted to prevent damage to the pivotable conveyor 26 when the latter is pivoted to a position wherein the pivotable conveyor second end 30 is located adjacent the ground surface 180 such as shown in phantom lines in FIG. 1.

Figure 23:
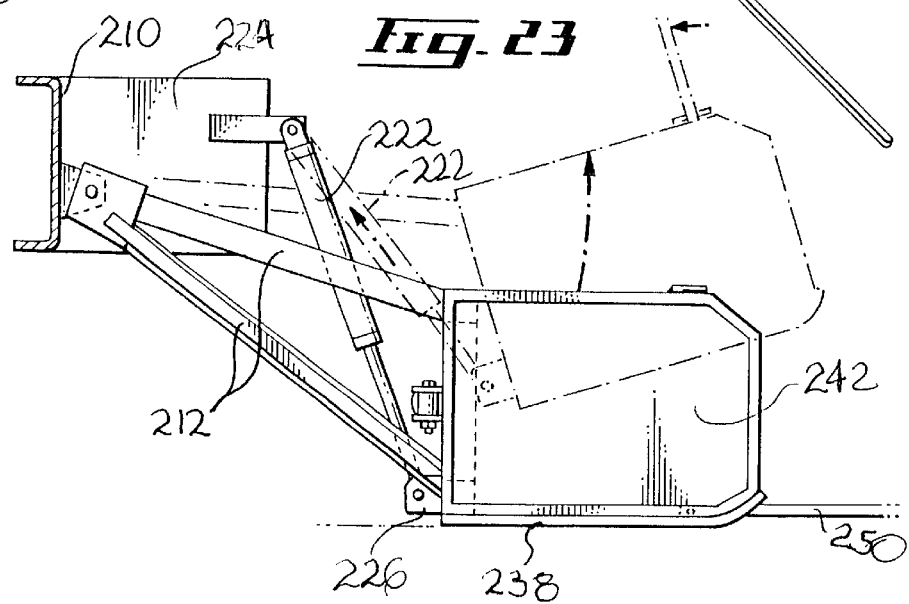
FIG. 23, in a side elevation view illustrates a plough arrangement par t of the invention being pivoted.

Referring now more specifically to FIGS. 22 through 27, there is shown a second dispensing adapter. The second dispensing adapter is adapted to be attached to the vehicle front end 14. The second vehicle adapter can either be mounted to the vehicle 12 while the first dispensing adapter in its stowed configuration is also attached to the vehicle 12 or it can be attached to the vehicle 12 while the first dispensing adapter is removed from the vehicle 12.

The second dispensing adapter includes a dispensing chute 182 attached to the vehicle 12 adjacent the vehicle front end 14. The dispensing chute 182 defines a chute inlet end 184 positioned adjacent the fixed conveyor discharge section 24. The dispensing chute 182 also defines a laterally and downwardly extending chute body 186 and chute outlet end 188 positioned laterally relative to the side of the vehicle 12.

In a preferred embodiment of the invention, the chute body 186 defines a generally frustro-pyramidal upper section 190 having deflecting flanges 192. The chute upper section 190 extends into a chute intermediate section 194 having a generally rectilinear configuration. The chute intermediate section 194 extends downwardly and sidewardly relative to the chute first section 190. The chute body 186 preferably further includes a chute lower section 196 having a downwardly oriented outlet mouth 198.

The chute body 186 preferably includes a chute positioning means for allowing customized adjustment of the lateral positioning of the chute outlet end 188 relative to the vehicle 12. Preferably, the chute positioning means includes at least one and preferably two pairs of adjustment slots 200 formed in opposite walls of the chute lower section 196. Fastenable guiding pins 202 are adapted to extend through the slots 200 for guiding the relative movement between the lower body section 196 and the intermediate section 194. The fastenable guiding pins are provided with corresponding pin heads that can be used to frictionally and releasably lock both sections 196, 194 in a predetermined spaced relationship relative to each other.

The second dispensing adapter preferably also includes a plough blade 204 attached to the vehicle 12 by a plough attachment frame 206. The plough blade 204 is attached to the vehicle 12 so as to be positioned substantially laterally relative to the vehicle 12 and rearwardly relative to the chute outlet 188. The plough attachment frame 206 typically includes a generally rectangular arrangement of plough frame rods attached to the front bumper 210 of the vehicle 12 by attachment arms 212.

The plough attachment frame 206 is preferably provided with a plough angle adjustment means for allowing the selective adjustment of the angular relationship between the plough blade 204 and a horizontal plane. The plough angle adjustment means is shown in greater details in FIG. 28. The plough angle adjustment means typically includes a first angle adjustment arm 208 and a second angle adjustment arm 209 respectively attached at distal ends thereof to upper and lower sections of the rear surface of the plough blade 204 and at proximal ends thereof to an adjustment bracket 211 fixed to the bumper 210.

The proximal end of the angle adjustment arm 208 is pivotally attached to the adjustment bracket 211 by amounting pin 213 while the proximal end of the angle adjustment arm 209 is pivotally attached to the adjustment bracket 211 by a mounting pin 218. The mounting pin 218 is slidably mounted within a vertical pin slot 220.

A biasing means preferably taking the form of a threaded handle 214 threadably engaging a mounting plate 216 and attached to the mounting pin 218 at a distal end thereof is used to vary the vertical position of the mounting pin 218 in the guiding slot 220 and, hence, the angle of the plough blade 204 preferably includes a threaded height adjustment bolt 214 having a handle 216 at one longitudinal end thereof and being attached at a second longitudinal end thereof to a guiding pin 218. The guiding pin 218, in turn, is attached to one of the attachment arms 212 and extends through an adjustment slot 220. The adjustment pin 218 is adapted to act as an adjustable pivoting axis for one of the attachment arms 212 while the other attachment arms 212 have a fixed pivoting axis thus allowing for adjustment of the angle of the plough blade 204.

The plough adjustment frame 206 is preferably further provided with a plough raising and lowering means for allowing the selective raising and lowering of the plough blade 204.

The raising and lowering means preferably includes a plough piston type component 222 attached at a proximal end thereof to an extension plate 224 protruding from the bumper 210 and at a distal end thereof to a pivotal attachment plate 226 extending rearwardly from the plough blade frame 206 preferably adjacent a lower edge thereof.

The plough attachment frame 206 is preferably further provided with a width adjustment means for allowing the selective adjustment of the width of the plough blade 204. As shown more specifically in FIGS. 26 and 27, the plough frame 206 includes sliding tubes 228 telescopically inserted within fixed tubes 230. A width adjustment piston-type component 232 solidly attached at a first end thereof to the fixed tubes 230 and at a second end thereof to the sliding tubes 228 is adapted to be used for telescopically moving the sliding tubes 228 in and out of the fixed tubes so as to vary the width of the plough blade 204 attached thereto as shown in FIG. 24.

Guiding flanges 234 are preferably provided for guiding the slideable movement of the sliding tubes 228 and of the plough blade 204 during the width adjustment operations. Various reinforcement rods such as reinforcement rod 236 are strategically positioned at various locations for increasing the overall structural stability of the plough blade arrangement.

The plough blade frame 206 is preferably further provided with frame supporting means such as skate components 238 extending perpendicularly relative to the plough blade 204 and caster-type wheels 240 preferably of the pivotable type attached to the plough blade frame 206. Lateral plough walls 242 preferably extend over the skate components 238. The plough blade may be mounted so as to extend laterally from either sides of the vehicle 12.

As shown in FIG. 26, a chute supporting bracket 244 extending over a skate component 238 is preferably further provided for further supporting the chute 182. A locking pin arrangement 246 is used for releasably locking a lower chute adapter 248 to the supporting bracket 244.

A guiding arm 250 may optionally extend frontward from one of the skates 238. The guiding arm 250 is adapted to be used by the driver of the vehicle 12 to align the chute 182 and associated plough blade 104 with the lateral edge of the road.

The embodiments of the invention in which an exclusive privilege or property is claimed are defined as follows:

1. A material dispensing system in combination with a flowable material delivering vehicle, said vehicle including a vehicle frame and an operator cab mounted on said vehicle frame, said operator cab defining a cab front end and a cab rear end, said vehicle also including a material container mounted on said vehicle frame rearwardly relative to said operator cab for receiving a volume of flowable material, said material container having a container outlet aperture, said material dispensing system comprising:

a fixed conveyor, said fixed conveyor being attached to said vehicle, said fixed conveyor extending continuously from a fixed conveyor receiving section located adjacent said container outlet aperture to a fixed conveyor discharge section located frontwardly relative to said cab rear end and adjacent said cab front end;

a dispensing adapter attached to said vehicle adjacent said fixed conveyor discharge section for receiving a portion of said flowable material when the latter emanates from said fixed conveyor discharge section and selectively dispensing said portion of flowable material at a predetermined location.

2. A material dispensing system in combination with a vehicle as recited in claim 1 wherein
   I. said vehicle includes a vehicle engine mounted generally frontwardly on said vehicle frame;
   II. said operator cab is mounted on said vehicle frame in a generally overlying relationship relative to said vehicle engine;
   III. said material container has a bottom wall and said container outlet aperture extends through said bottom wall;
   IV. said fixed conveyor is positioned generally underneath said bottom wall and extends continuously from a fixed conveyor receiving section located underneath said container outlet aperture to a fixed conveyor discharge section located frontwardly relative to said cab rear end and adjacent said cab front end.

3. A material dispensing system in combination with a vehicle as recited in claim 1 wherein said dispensing adapter includes
   a pivotable conveyor, said pivotable conveyor having a generally elongated configuration defining a pivotable conveyor first end and a pivotable conveyor second end, said pivotable conveyor first end being pivotally attached to said vehicle adjacent said fixed conveyor discharge section;
   a conveyor configuring means for allowing said pivotable conveyor to pivot between a stowed configuration wherein it lies in a generally proximal and parallel relationship relative to an edge of said vehicle and a working configuration wherein said pivotable conveyor extends away from said vehicle so as to allow discharging of at least a portion of said volume of flowable material away from said vehicle.

4. A material dispensing system in combination with a vehicle as recited in claim 3 wherein
   said pivotable conveyor first end is pivotally attached to an aligning structure, said aligning structure being pivotally attached to said vehicle adjacent said vehicle front end;
   said conveyor configuring means including
      a first pivoting means for pivoting said aligning structure about a generally vertical first pivotal axis between an aligning structure first position wherein said pivotable conveyor first end is generally in register with said fixed conveyor discharge section and an aligning structure second position wherein said pivotable conveyor first end is generally offset laterally relative to said fixed conveyor discharge section;
      I. a second pivoting means for pivoting said pivotable conveyor relative to said aligning structure about a generally vertical second pivotal axis so that the trajectory of said pivotable conveyor second end defines a generally horizontal arc when said pivotable conveyor pivots about said second pivotal axis;
      whereby,
         I. when said aligning structure is in said aligning structure first position, said pivotable conveyor is in said working configuration wherein said pivotable conveyor extends away from said vehicle so as to allow discharging of at least a portion of said volume of flowable material away from said vehicle through a predetermined arc determined by the pivotal movement of said pivotable conveyor relative to said aligning structure and,
         II. when said aligning structure is in said aligning structure second position, said pivotable conveyor can be pivoted relative to said aligning structure to said stowed position wherein said pivotable conveyor extends in a generally proximate and parallel relationship with a vehicle edge.

5. A material dispensing system in combination with a vehicle as recited in claim 4 including
   I. a supporting platform defining a platform base plate attached to said vehicle adjacent said vehicle front end;
   II. a linkage arm defining a linkage arm longitudinal axis, a linkage arm first end and an opposed linkage arm second end; said linkage arm first end being pivotally attached to said platform base plate and said pivotable conveyor first end being pivotally attached to said linkage arm second end;
   III. a first pivoting drive means mechanically coupled to both said supporting platform and said linkage arm for selectively pivoting said linkage arm relative to said supporting platform;
   IV. a second drive means mechanically coupled to both said linkage arm and said pivotable conveyor for selectively pivoting said pivotable conveyor relative to said linkage arm.

6. A material dispensing system in combination with a vehicle as recited in claim 1 wherein said conveyor configuring means allows said pivotable conveyor to pivot between a stowed configuration wherein it lies in a generally proximal and parallel relationship relative to a lateral and generally longitudinally extending edge of said vehicle and a working configuration wherein said pivotable conveyor extends away from said vehicle so as to allow discharging of at least a portion of said volume offlowable material away from said vehicle.

7. A material dispensing system in combination with a vehicle as recited in claim 6 further comprising a third pivoting means for pivoting said pivotable conveyor about a generally horizontal third pivotal axis so that the trajectory of said pivotable conveyor second end forms a generally vertical arc when said pivotable conveyor is pivoted about said third pivotal axis.

8. A material dispensing system in combination with a vehicle as recited in claim 6 wherein said pivotable conveyor includes
   I. a pivotable conveyor belt;
   II. a belt configuring means mechanically coupled to said pivotable conveyor for allowing the cross-sectional configuration of a configurable section of said pivotable conveyor belt located adjacent said pivotable conveyor second end to be modified so as to vary the dispensing pattern of said flowable material as said flowable material is dispensed by said pivotable conveyor.

9. A material dispensing system in combination with a vehicle as recited in claim 8 wherein said pivotable conveyor includes
   a generally elongated truss-like boom frame pivotally attached to said aligning structure, said boom frame including a pair of spaced apart side plates;
   a pair of configuring rollers supporting at least a fraction of said configurable section, each of said configuration rollers having a corresponding configuration roller axle for allowing rotation of said configuration rollers about their respective longitudinal axis, each of said configuration rollers defining a configuration roller proximal end located relatively proximal to an adjacent side plate and a configuration roller distal end located relative distally relative to an adjacent side plate, said configuration roller distal ends being in a relatively proximal relationship relative to each other;

a roller pivoting means attached to said configuration rollers for pivoting said configuration rollers between a concave configuration wherein said pair of configuration rollers extend at an angle from each other with said configuration roller distal ends positioned in a first geometrical plane located above said configuration roller proximal ends and a convex configuration wherein said pair of configuration rollers extend at an angle from each other with said configuration roller distal ends positioned in a second geometrical plane located underneath said configuration roller proximal ends.

10. A material dispensing system in combination with a vehicle as recited in claim 1 wherein said dispensing adapter includes a dispensing chute attached to said vehicle adjacent said vehicle front end;

said dispensing chute defining a chute inlet end positioned adjacent said fixed conveyor discharge section, a laterally and downwardly extending chute body and a chute outlet end positioned laterally relative to said vehicle.

11. A material dispensing system in combination with a vehicle as recited in claim 10 wherein said dispensing chute includes a chute positioning means for allowing adjustment of the lateral positioning of said chute outlet relative to said vehicle.

12. A material dispensing system in combination with a flowable material delivering vehicle, said vehicle defining a vehicle front end and a vehicle rear end, said vehicle including a vehicle frame mounted on wheels, an operator cab mounted on said vehicle frame adjacent said vehicle front end, a material container mounted on said vehicle frame rearwardly relative to said operator cab, said material container having a bottom wall defining a container, outlet aperture, a blocking gate for selectively blocking said container outlet aperture, said material dispensing system comprising:

a fixed conveyor means, said fixed conveyor means being attached to said vehicle so as to extend from a position substantially underneath said container outlet aperture to a position located adjacent said vehicle front end, said fixed conveyor means defining a frontwardly positioned fixed conveyor discharge section;

a dispensing adapter for selectively dispensing said flowable material emanating from said fixed conveyor discharge section at a predetermined location according to a predetermined dispensing pattern; said dispensing adapter including a pivotable conveyor means, said pivotable conveyor means having a generally elongated configuration defining a pivotable conveyor first end and a pivotable conveyor second end, said pivotable conveyor first end being pivotally attached to an aligning structure, said aligning structure being pivotally attached to said vehicle adjacent said vehicle front end;

first pivoting means for pivoting said aligning structure about a substantially vertical first pivotal axis between a working position wherein said pivotable conveyor first end is substantially in register with said fixed conveyor discharge section and a stowed position wherein said pivotable conveyor first end is positioned laterally relative to said fixed conveyor discharge section;

second pivoting means for pivoting said pivotable conveyor about a substantially vertical second pivotal axis so that the trajectory of said pivotable conveyor second end forms a generally horizontal arc;

whereby when said aligning structure is in said working position said pivotable conveyor can be used to discharge flowable material emanating from said fixed conveyor discharge section away from said vehicle through a predetermined arc and when said aligning structure is in said stowed position said pivotable conveyor can be pivoted to a lateral position substantially proximal and parallel to said vehicle frame; said dispensing system further comprising a third pivoting means for pivoting said pivotable conveyor about a substantially horizontal third pivotal axis so that the trajectory of said pivotable conveyor second end forms a generally vertical arc; said first pivoting means including a supporting platform defining a platform base plate attached to said vehicle adjacent said vehicle front end;

a linkage arm defining a linkage arm longitudinal axis, a linkage arm first end and an opposed linkage arm second end, said linkage arm first end being pivotally attached to said platform base plate and said pivotable conveyor first end being pivotally attached to said linkage arm second end;

a first pivoting drive means mechanically coupled to both said supporting platform and said linkage arm for selectively pivoting said linkage arm relative to said supporting platform;

said linkage arm being provided with a linkage arm first sleeve extending in a direction generally perpendicular to said linkage arm longitudinal axis, said linkage arm first sleeve defining a first sleeve first end and an opposed first sleeve second end;

a substantially vertical platform mast extending from said platform base plate;

a mast first mounting plate extending from an upper segment of said platform mast, said mast first mounting plate having a first axle stub extending perpendicularly therefrom, said first axle stub being inserted in said first sleeve first end;

said platform base plate being provided with a second axle stub extending perpendicularly therefrom, said second axle stub being inserted in said first sleeve second end.

13. A dispensing system as recited in claim 12 wherein a mast second mounting plate extends from said platform mast intermediate said mast first mounting plate and said platform base plate;

a first sleeve sprocket is mounted on said first sleeve;

a first driving motor is attached to said mast second mounting plate, said first driving motor having a first driving chain mechanically coupled to said first sleeve sprocket.

14. A dispensing system as recited in claim 13 wherein said platform mast defines a pair of angled mast abutment surfaces and said linkage arm defines a pair of arm abutment surfaces, said mast abutment surfaces and said arm abutment surfaces being configured and sized for abuttingly limiting the range of pivotal movement between said supporting platform and said linkage arm between said working and said stowed positions.

15. A dispensing system as recited in claim 14 wherein
said linkage arm is provided with a linkage arm second sleeve positioned substantially opposite said linkage arm first sleeve and extending in a direction generally perpendicular to said linkage arm longitudinal axis, said linkage arm second sleeve defining a second sleeve first end and an opposed second sleeve second end;
a pivotable conveyor axle is rotatably inserted in said linkage arm second sleeve;
a pivotable conveyor attachment plate is solidly attached to said pivotable conveyor axle;
a second pivoting drive means mechanically coupled to both said linkage arm and said pivotable conveyor axle for selectively pivoting said pivotable conveyor attachment plate relative to said linkage arm.

16. A dispensing system as recited in claim 15 wherein
a linkage arm mounting plate is fixed to said linkage arm intermediate said linkage arm first and second sleeves;
an axle sprocket is mounted on said axle intermediate said second sleeve and said pivotable conveyor attachment plate;
a second driving motor is attached to said linkage arm mounting plate, said second driving motor having a second driving chain mechanically coupled to said axle sprocket.

17. A dispensing system as recited in claim 16 wherein
said pivotable conveyor attachment plate is provided with
a pair of mounting plate flanges extending substantially perpendicularly therefrom;
a flange axle extends from at least one of the mounting plate flanges, said flange axle being rotatably attached to said pivotable conveyor means adjacent said pivotable conveyor first end;
a third pivoting drive means is mechanically coupled to both said second sleeve and said pivotable conveyor for selectively pivoting said pivotable conveyor relative to said linkage arm about said flange axle.

18. A dispensing system as recited in claim 17 wherein
a second sleeve mounting plate is fixed to said second sleeve opposite said pivotable conveyor attachment plate;
a jack-type component is attached at a jack first end thereof to said second sleeve mounting plate and at a jack second end thereof to said pivotable conveyor distally relative to said flange axle.

19. A material dispensing system for use with a flowable material delivering vehicle, said vehicle defining a vehicle front end and a vehicle rear end, said vehicle including a vehicle frame mounted on wheels, an operator cab mounted on said vehicle frame adjacent said vehicle front end, a material container mounted on said vehicle frame rearwardly relative to said operator cab, said material container having a bottom wall defining a container outlet aperture, a blocking gate for selectively blocking said container outlet aperture, said material dispensing system comprising:
a fixed conveyor means, said fixed conveyor means being attached to said vehicle so as to extend from a position substantially underneath said container outlet aperture to a position located adjacent said vehicle front end, said fixed conveyor means defining a frontwardly positioned fixed conveyor discharge section;
a dispensing adapter for selectively dispensing said flowable material emanating from said fixed conveyor discharge section at a predetermined location according to a predetermined dispensing-pattern; said dispensing adapter including a pivotable conveyor means, said pivotable conveyor means having a generally elongated configuration defining a pivotable conveyor first end and a pivotable conveyor second end, said pivotable conveyor first end being pivotally attached to an aligning structure, said aligning structure being pivotally attached to said vehicle adjacent said vehicle-front end;
first pivoting means for pivoting said aligning structure about a substantially vertical first pivotal axis between a working position wherein said pivotable conveyor first end is substantially in register with said fixed conveyor discharge section and a stowed position wherein said pivotable conveyor first end is positioned laterally relative to said fixed conveyor discharge section;
second pivoting means for pivoting said pivotable conveyor about a substantially vertical second pivotal axis so that the trajectory of said pivotable conveyor second end forms a generally horizontal arc;
whereby When said aligning structure is in said working position said pivotable conveyor can be used to discharge flowable material emanating from said fixed conveyor discharge section away from said vehicle through a predetermined arc and when said aligning structure is in said stowed position said pivotable conveyor can be pivoted to a lateral position substantially proximal and parallel to said vehicle frame; said pivotable conveyor means including
a generally elongated truss-like boom frame pivotally attached to said aligning structure, said boom frame including a pair of spaced apart side plates;
first and second end drums rotatably mounted to said boom frame between said side plates respectively adjacent said pivotable conveyor first and second ends;
intervening longitudinally spaced apart idler rollers;
an endless conveyor belt extending around said first and second end drums and supported along said boom frame by said idler rollers;
a belt configuring means for allowing the cross-sectional configuration of a predetermined longitudinal configurable section of said conveyor belt to be selectively changed between a generally concave cross-sectional configuration and a generally convex cross-sectional configuration.

20. A dispensing system as recited in claim 19 wherein said belt configuring means includes
a pair of configuring rollers supporting at least a fraction of said configurable section, each of said configuration rollers having a corresponding configuration roller axle for allowing rotation of said configuration rollers about their respective longitudinal axis, each of said configuration rollers defining a configuration roller proximal end located relatively proximal to an adjacent side plate and a configuration roller distal end located relative distally relative to an adjacent side plate, said configuration roller distal ends being in a relatively proximal relationship relative to each other;
a roller pivoting means attached to said configuration rollers for pivoting said configuration rollers between a concave configuration wherein said pair of configuration rollers extend at an angle from each other with said configuration roller distal ends positioned in a first geometrical plane located above said configuration roller proximal ends and a convex configuration wherein said pair of configuration rollers extend at an angle from each other with said configuration roller distal ends positioned in a second geometrical plane located underneath said configuration roller proximal ends.

21. A dispensing system as recited in claim 20 wherein said roller pivoting means includes a rocker arm, said rocker arm defining a rocker arm proximal end and a rocker arm distal end, said rocker arm proximal end being attached by an arm-to-piston attachment means to the distal end of a piston-type component, said piston-type component being attached at a proximal end thereof to said boom frame; said rocker arm distal end being attached by an arm-to-roller attachment means to both said configuration roller distal ends; said rocker arm being pivotally attached intermediate said rocker arm proximal and distal ends to said boom frame by an arm-to-frame attachment means so as to allow said rocker arm to pivot about a generally horizontal rocker arm pivotal axis; said rocker arm being configured and sized such that linear movement of said piston-type component causes said rocker arm to pivot about said rocker arm pivotal axis and said pair of configuration rollers to pivot between said concave and convex configurations.

22. A dispensing system as recited in claim 21 wherein said dispensing adapter includes a dispensing chute attached to said vehicle adjacent said vehicle front end; said dispensing chute defining a chute inlet end positioned adjacent said fixed conveyor discharge section, a laterally and downwardly extending chute body and a chute outlet end positioned laterally relative to said vehicle.

23. A dispensing system as recited in claim 22 wherein said chute body includes a chute positioning means for allowing customized adjustment of the lateral positioning of said chute outlet end relative to said vehicle.

24. A dispensing system as recited in claim 23 wherein said dispensing adapter also includes a plough blade, said plough blade being attached to said vehicle by a plough attachment frame so that said plough blade is positioned laterally relative to said vehicle and rearwardly relative to said chute outlet.

25. A dispensing system as recited in claim 24 wherein said plough attachment frame is provided with a plough angle adjustment means for allowing the selective adjustment of the angular relationship between said plough blade and a horizontal plane.

26. A dispensing system as recited in claim 24 wherein said plough attachment frame is provided with a plough raising and lowering means for allowing the selective raising and lowering of said plough blade.

27. A dispensing system as recited in claim 24 wherein said plough attachment frame is provided with a plough width adjustment means for allowing the selective adjustment of the width of said plough blade.

* * * * *